(12) United States Patent
Boyanov et al.

(10) Patent No.: US 12,455,277 B2
(45) Date of Patent: Oct. 28, 2025

(54) ISOLATION OF CELLS IN A NANOPORE SENSOR ARRAY

(71) Applicant: ILLUMINA, INC., San Diego, CA (US)

(72) Inventors: Boyan Boyanov, San Diego, CA (US); Craig Ciesla, Mountain View, CA (US); Anthony Flannery, San Diego, CA (US); Gerald Kreindl, Singapore (SG); Rean Silke Musa, La Jolla, CA (US); Darren Segale, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 523 days.

(21) Appl. No.: 17/934,175

(22) Filed: Sep. 21, 2022

(65) Prior Publication Data
US 2023/0112203 A1 Apr. 13, 2023

Related U.S. Application Data

(60) Provisional application No. 63/261,937, filed on Sep. 30, 2021.

(51) Int. Cl.
*G01N 33/487* (2006.01)
*B01L 3/00* (2006.01)
(Continued)

(52) U.S. Cl.
CPC .. *G01N 33/48721* (2013.01); *B01L 3/502707* (2013.01); *C12Q 1/6869* (2013.01);
(Continued)

(58) Field of Classification Search
None
See application file for complete search history.

(56) References Cited

U.S. PATENT DOCUMENTS 5,432,272 A 7/1995 Benner
6,150,510 A 11/2000 Seela et al.
(Continued)

FOREIGN PATENT DOCUMENTS

EP 2411536 9/2014
WO WO 92/02258 2/1992
(Continued)

OTHER PUBLICATIONS

S. Paul, et al., "Single-bubble dynamics in nanopores: Transition between homogeneous and heterogeneous nucleation", Physical Review Research, 2(4): paper 043400, 14 pages, Dec. 2020.*
(Continued)

*Primary Examiner* — J. Christopher Ball
(74) *Attorney, Agent, or Firm* — Knobbe Martens Olson & Bear LLP

(57) ABSTRACT

Devices for sequencing biopolymers and methods of using the devices are disclosed. In one example, such a device has a nanopore, a plurality of wells and fluidic tunnels to allow a biopolymer to translocate in the device. In some embodiments, the device may include integrated electronics or micro-electromechanical systems, such as valves, bubble generators/annihilators or pressure pulse generators, to actively control fluidic/ionic/electric flows in the device.

28 Claims, 14 Drawing Sheets

(51) Int. Cl.
  *B82Y 15/00* (2011.01)
  *B82Y 30/00* (2011.01)
  *C12Q 1/6869* (2018.01)
  *G01N 27/414* (2006.01)

(52) U.S. Cl.
  CPC .. *G01N 27/4146* (2013.01); *B01L 2300/0645* (2013.01); *B82Y 15/00* (2013.01); *B82Y 30/00* (2013.01); *G01N 27/4145* (2013.01)

(56) References Cited

U.S. PATENT DOCUMENTS

| | | |
|---|---|---|
| 6,329,178 B1 | 12/2001 | Patel et al. |
| 6,395,524 B2 | 5/2002 | Loeb et al. |
| 6,413,792 B1 | 7/2002 | Sauer et al. |
| 6,602,695 B2 | 8/2003 | Patel et al. |
| 7,279,337 B2 | 10/2007 | Zhu |
| 8,628,919 B2 | 1/2014 | Xiao et al. |
| 8,669,124 B2 | 3/2014 | Merz et al. |
| 8,698,481 B2 | 4/2014 | Lieber et al. |
| 8,961,763 B2 | 2/2015 | Dunbar et al. |
| 9,017,937 B1 | 4/2015 | Turner et al. |
| 9,696,277 B2 | 7/2017 | Dunbar et al. |
| 9,863,912 B2 | 1/2018 | Dunbar et al. |
| RE47,067 E | 10/2018 | Turner et al. |
| 10,488,394 B2 | 11/2019 | Liu et al. |
| 11,054,390 B2 | 7/2021 | Dunbar et al. |
| 2006/0105461 A1 | 5/2006 | Tom-Moy et al. |
| 2007/0048748 A1 | 3/2007 | Williams et al. |
| 2012/0052188 A1 | 3/2012 | Chen et al. |
| 2016/0122815 A1 | 5/2016 | Yanagi et al. |
| 2020/0171489 A1* | 6/2020 | Meller ............. G01N 33/48721 |
| 2020/0292521 A1 | 9/2020 | Xie et al. |

FOREIGN PATENT DOCUMENTS

| | | |
|---|---|---|
| WO | WO 93/10820 | 6/1993 |
| WO | WO 94/22892 | 10/1994 |
| WO | WO 94/24144 | 10/1994 |
| WO | WO 15/061510 | 4/2015 |
| WO | WO 15/200756 | 12/2015 |
| WO | WO 22/005780 | 1/2022 |
| WO | WO 22/212038 | 10/2022 |
| WO | WO 23/278781 | 1/2023 |

OTHER PUBLICATIONS

Boustheen et al., 2008, Active microvalves for micro-fluidic networks in plastics-selecting suitable actuation schemes, 4th International Conference Multi-Material Micro Manufacture (4M2008), Whittles Publishing Ltd., Cardiff, UK. 4 pp.

Che et al., 2019, Double-crosslinked reversible redox-responsive hydrogels based on disulfide-thiol interchange, Journal of Polymer Science Part A: Polymer Chemistry, 57:2590-260 and Supporting Information.

Dong et al., Aug. 18, 2020, Direct observation of redox-induced bubble generation and nanopore formation dynamics in controlled dielectric breakdown, ACS Applied Electronic Materials, 2(9):2954-2960.

Fei et al., 2006, A redox responsive polymeric gel based on ionic crosslinking, Soft Matter, 2:397-401.

Mukherjee et al., Nov. 2017, A review of micromachined thermal accelerometers, Journal of Micromechanics and Microengineering, 27(12):123002, 34 pp.

Oh et al., 2006, A review of microvalves, J. Micromech. Microeng., 16:R13-R39.

Qian et al., 2020, Actuation mechanism of microvalves: a review, Micromachines, 11:172, 38 pp.

Singer, 1989, UV spectral characteristics and acidic dissociation constants of 280 alkyl bases, nucleosides, and nucleotides, in Fasman ed., Practical Handbook of Biochemistry and Molecular Biology, CRC Press, Boca Raton, FL, pp. 385-394.

Smith et al., Jun. 24-27, 1991, A Silicon Self-Aligned Non-Reverse Valve, Proceedings of Transducers '91, the 1991 International Conference on Solid-State Sensors and Actuators, San Francisco, CA, pp. 1049-1051.

International Search Report and Written Opinion dated Dec. 12, 2022 in application No. PCT/US/2022/044432.

* cited by examiner

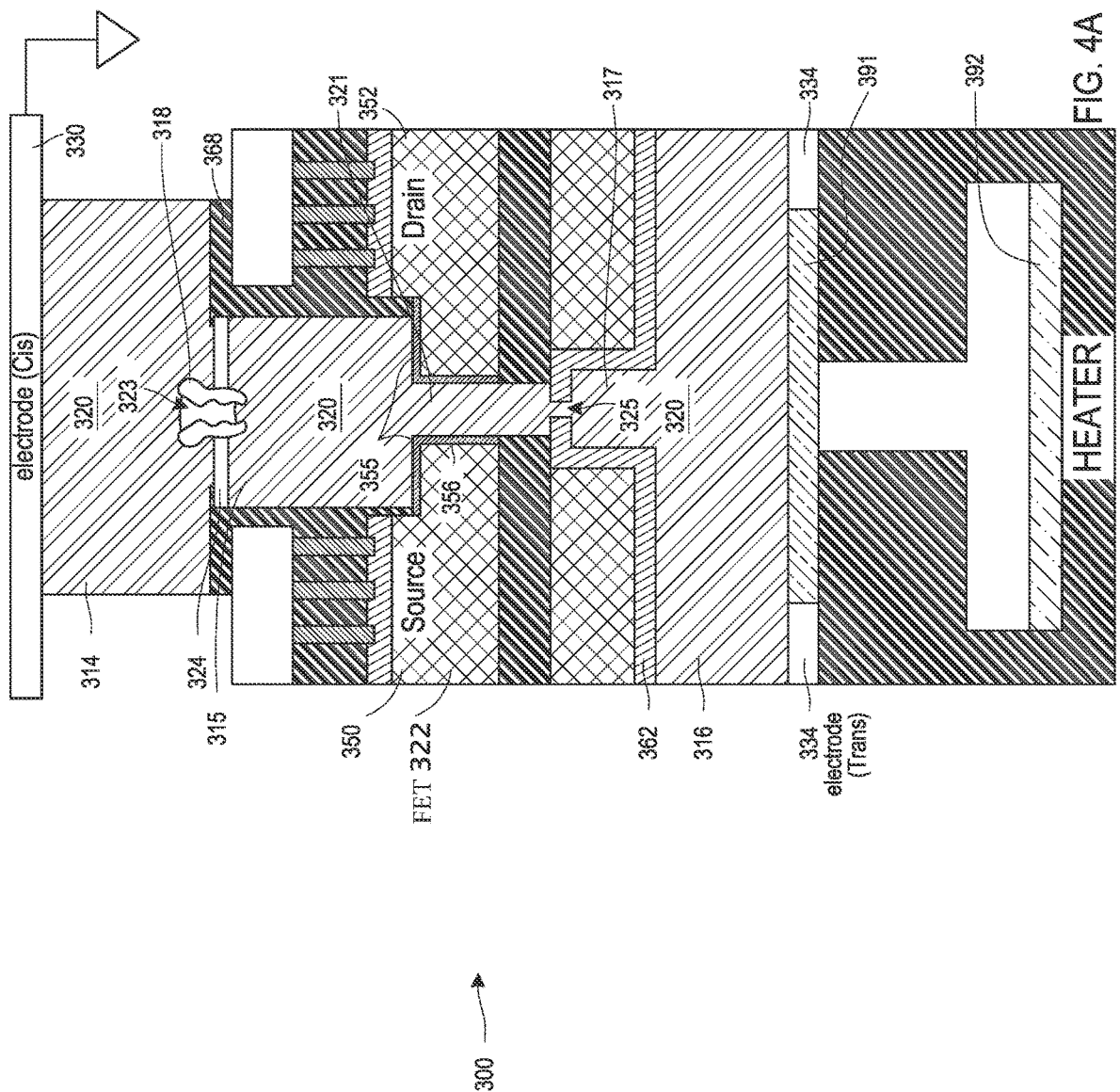

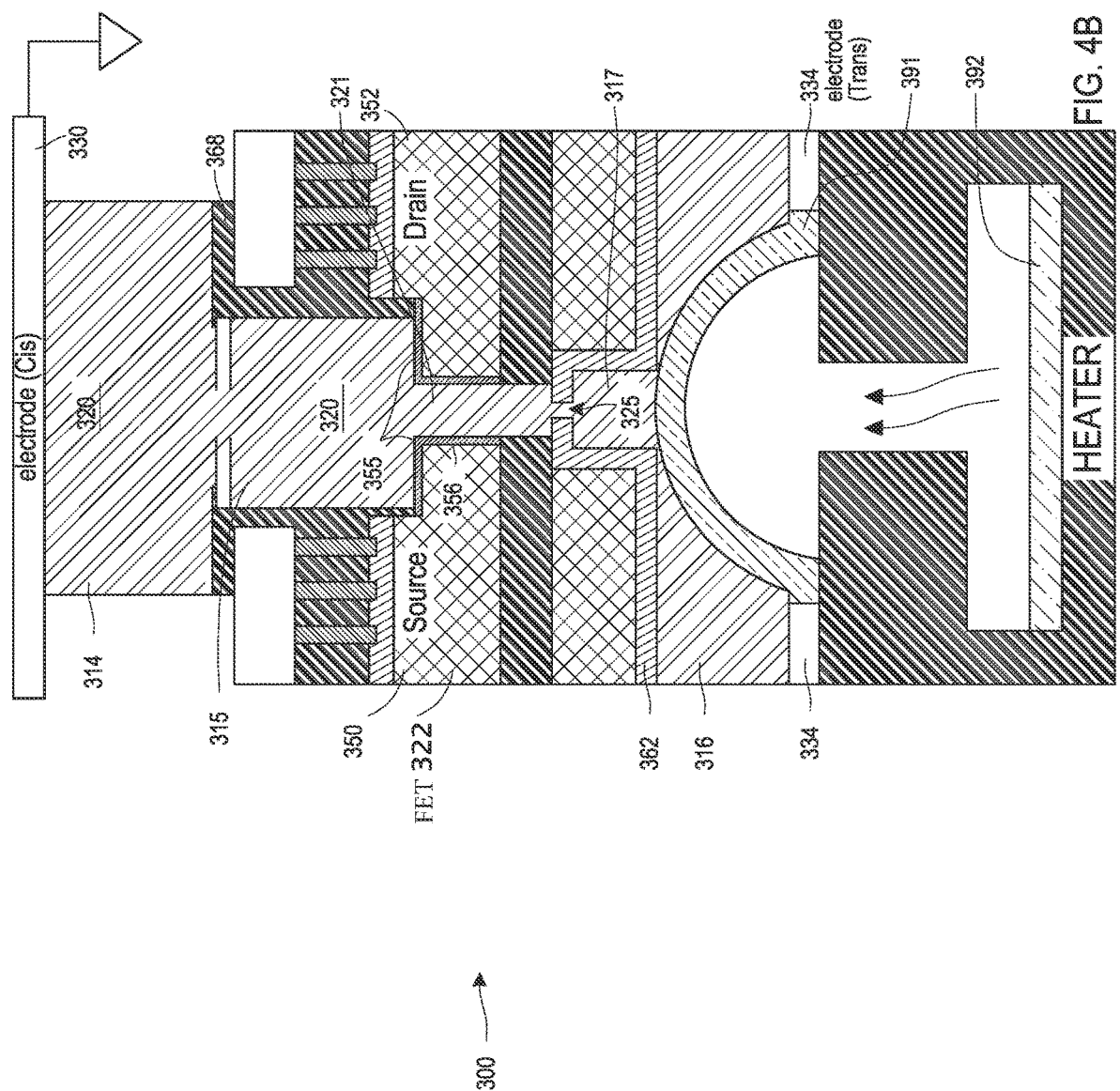

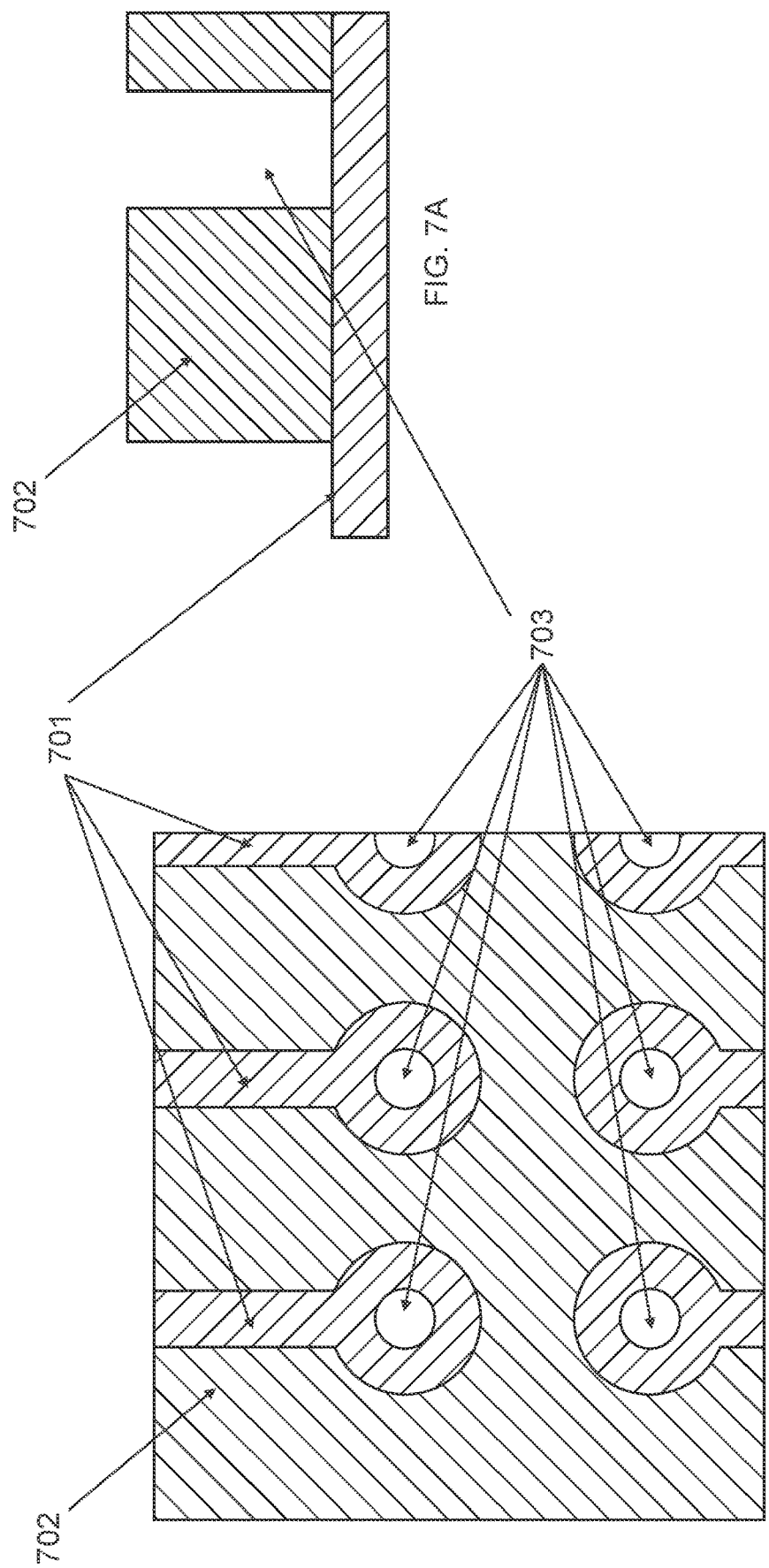

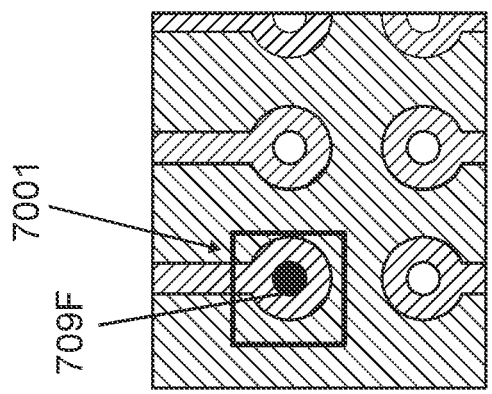
FIG. 7C  FIG. 7D  FIG. 7E  FIG. 7F
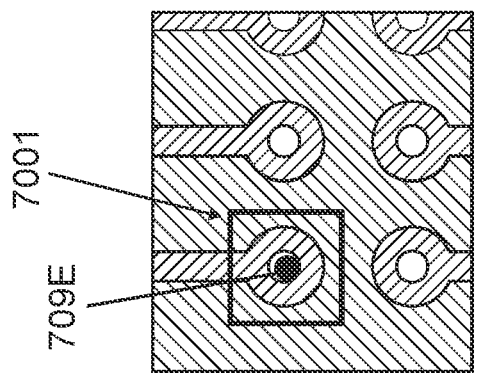
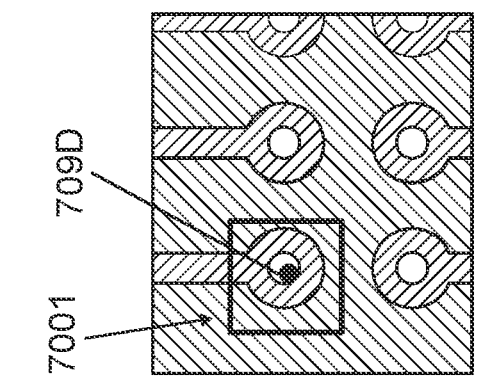
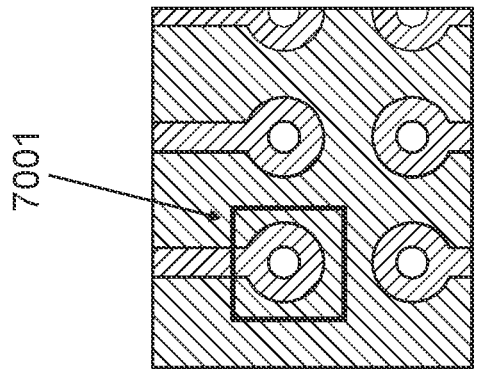
FIG. 7G  FIG. 7H
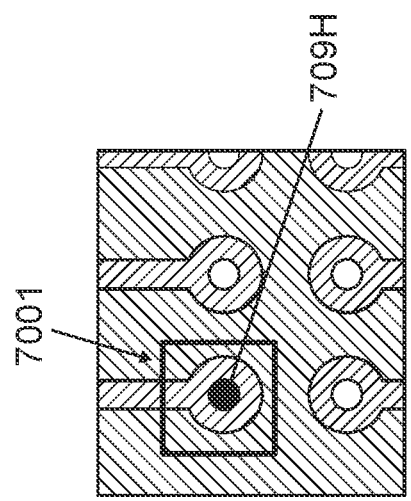
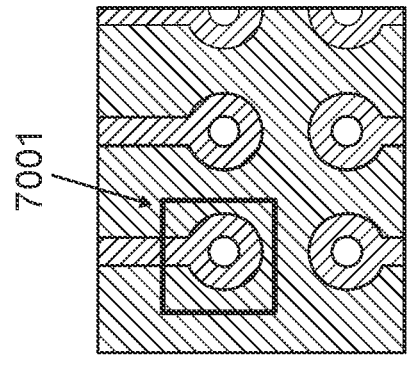

ISOLATION OF CELLS IN A NANOPORE SENSOR ARRAY

CROSS-REFERENCE TO RELATED APPLICATIONS

This application claims priority to U.S. Provisional Application No. 63/261,937, filed Sep. 30, 2021, the contents of which is incorporated by reference in its entirety.

FIELD

The present technology relates generally to devices for determining the sequence of a biopolymer, such as a polynucleotide or polypeptide, and more specifically to nanopore sequencing devices.

BACKGROUND

Some polynucleotide sequencing techniques involve performing a large number of controlled reactions on support surfaces or within predefined reaction chambers. The controlled reactions may then be observed or detected, and subsequent analysis may help identify properties of the polynucleotide involved in the reaction. Examples of such sequencing techniques include next-generation sequencing or massive parallel sequencing involving long-read single molecule sequencing, sequencing-by-ligation, sequencing-by-synthesis, reversible terminator chemistry, or pyrosequencing approaches.

Some polynucleotide sequencing techniques utilize a nanopore, which can provide a path for an ionic electrical current. For example, as a polynucleotide traverses through a nanopore, each nucleic acid in the polynucleotide influences the electrical current through the nanopore. For example, each passing nucleotide, or series of nucleotides, that passes through the nanopore yields a characteristic electrical current. These characteristic electrical currents that are unique to each of the different nucleotides of the traversing polynucleotide can be recorded to determine the sequence of the polynucleotide.

Some nanopore sequencing techniques may operate a plurality of connected nanopore devices in an array format, such as shown in FIG. 1. For example, the nanopore array 100A shown in FIG. 1 includes multiple nanopore unit cells, and the unit cells share a common cis well 114A associated with a common cis electrode 130A and a common trans well 116A associated with a common trans electrode 134A. The whole array 100A may be filled with an electrolyte fluid 120A. A particular unit cell 101A in the array may include a pore-forming protein 118A having a nanopore 123A residing in a membrane 124A. The nanopore 123A may be fluidically connected in series with a solid-state pore 125A. The characteristic current as the polynucleotide traverses through the nanopore 123A may be measured using a field-effect transistor (FET) 122A disposed between the nanopore 123A and the solid-state pore 125A. The location of the FET 122A is indicated in FIG. 1 by its "Source" and "Drain" illustrated in FIG. 1.

Missing or ruptured membranes may be present in a few percent of the unit cells, one example of a ruptured membrane 1241A is shown at the right-hand side of FIG. 1. Since all unit cells share common cis/trans wells, and since the resistance of a solid-state pore is about 10% of the resistance of a protein nanopore, a large current 1001A may pass through the unit cell 1010A having a missing/ruptured membrane. This large current can have deleterious effects, such as affecting the signals of neighboring unit cells, or depleting the redox reagents of the electrolyte in the common cis/trans wells.

SUMMARY

The following are examples of certain devices for sequencing biopolymers (e.g., polynucleotides or proteins) and methods of using the devices.

In some embodiments, such a device may have a nanopore and a plurality of wells and/or fluidic tunnels. A biopolymer may translocate through the nanopore in such a nanopore device. When one or more monomers (e.g., nucleotides or amino acids) of the biopolymer are near or at the nanopore, the electrical resistance of the nanopore may vary in response to the identity of the one or more monomers. In some embodiments, a plurality of nanopore sensor devices may form a nanopore sequencing array.

In some embodiments, disclosed are methods and systems for mitigating undesirable side effects that may occur when operating a nanopore sequencing array. For example, disclosed methods and systems can prevent a few malfunctioning or failed nanopore sensor devices from affecting the operation of the entire sequencing array. For another example, the disclosed methods and systems can mitigate the consumption of redox reagents resulting from a large uncontrolled current passing through a malfunctioning or failed nanopore sensor within an array. In an example nanopore sensor having a solid-state pore/channel and a biological nanopore (e.g., a protein nanopore disposed in a membrane), the nanopore sensor may be considered malfunctioning or failed if the solid-state pore/channel and/or the biological pore is not properly formed, for example if the protein nanopore is not inserted in the membrane. A nanopore sensor may also be considered malfunctioning or failed if a membrane is not formed (e.g., a lipid membrane is not properly formed during painting of the lipid membrane). A nanopore sensor may also be considered malfunctioning or failed if the membrane pops, bursts or becomes punctured during the sequencing process.

In some embodiments, a nanopore sensor device may include integrated electronics and/or micro-electromechanical systems to actively control fluidic/ionic/electric flows in the device. For example, the device may include micro-electromechanical valves (MEMS valves) to isolate failed nanopore sensors from the rest of the array. For another example, the device may include air/gas bubble generators, air/gas bubble annihilators or pressure pulse generators to block, modulate or unblock fluidic/ionic/electric flows in the device. In some embodiments, the device includes a component that can generate a bubble sufficient to interrupt ionic current flow between the cis electrode and the trans electrode. The component can include a switch connecting an electrode for electrolysis to a voltage source, or a switch connecting a heating element (e.g., a resistive heater) to a voltage source.

Additional details of exemplary nanopore sequencing devices and methods of operating the devices that can be used in conjunction with the present disclosure can be found in U.S. Provisional Patent Application Nos. 63/200,868, 63/169,041, and 63/202,971, and International Patent Application Number PCT/US2021/038125, the entirety of each of the disclosures is incorporated herein by reference.

The systems, devices, kits, and methods disclosed herein each have several aspects, no single one of which is solely responsible for their desirable attributes. Without limiting the scope of the claims, some prominent features will now be discussed briefly. Numerous other examples are also contemplated, including examples that have fewer, additional, and/or different components, steps, features, objects, benefits, and advantages. The components, aspects, and steps may also be arranged and ordered differently. After considering this discussion, and particularly after reading the section entitled "Detailed Description," one will understand how the features of the devices and methods disclosed herein provide advantages over other known devices and methods.

It is to be understood that any features of the device and/or of the array disclosed herein may be combined together in any desirable manner and/or configuration. Further, it is to be understood that any features of the method of using the device may be combined together in any desirable manner. Moreover, it is to be understood that any combination of features of this method and/or of the device and/or of the array may be used together, and/or may be combined with any of the examples disclosed herein. Still further, it is to be understood that any feature or combination of features of any of the devices and/or of the arrays and/or of any of the methods may be combined together in any desirable manner, and/or may be combined with any of the examples disclosed herein.

It should be appreciated that all combinations of the foregoing concepts and additional concepts discussed in greater detail below are contemplated as being part of the inventive subject matter disclosed herein and may be used to achieve the benefits and advantages described herein.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3B-1, FIG. 3B-2 and FIG. 3C schematically illustrate an example control logic which can be used to control the operation of the example sequencing array shown in FIG. 3A.

FIG. 4A and FIG. 4B schematically illustrate an embodiment of nanopore sequencing device with a heater and an elastomeric valve.

FIGS. 7A-H schematically illustrate bubble formation by way of an example electrolysis mechanism described in connection with FIG. 2A and FIG. 2B.

DETAILED DESCRIPTION

Figure 1:
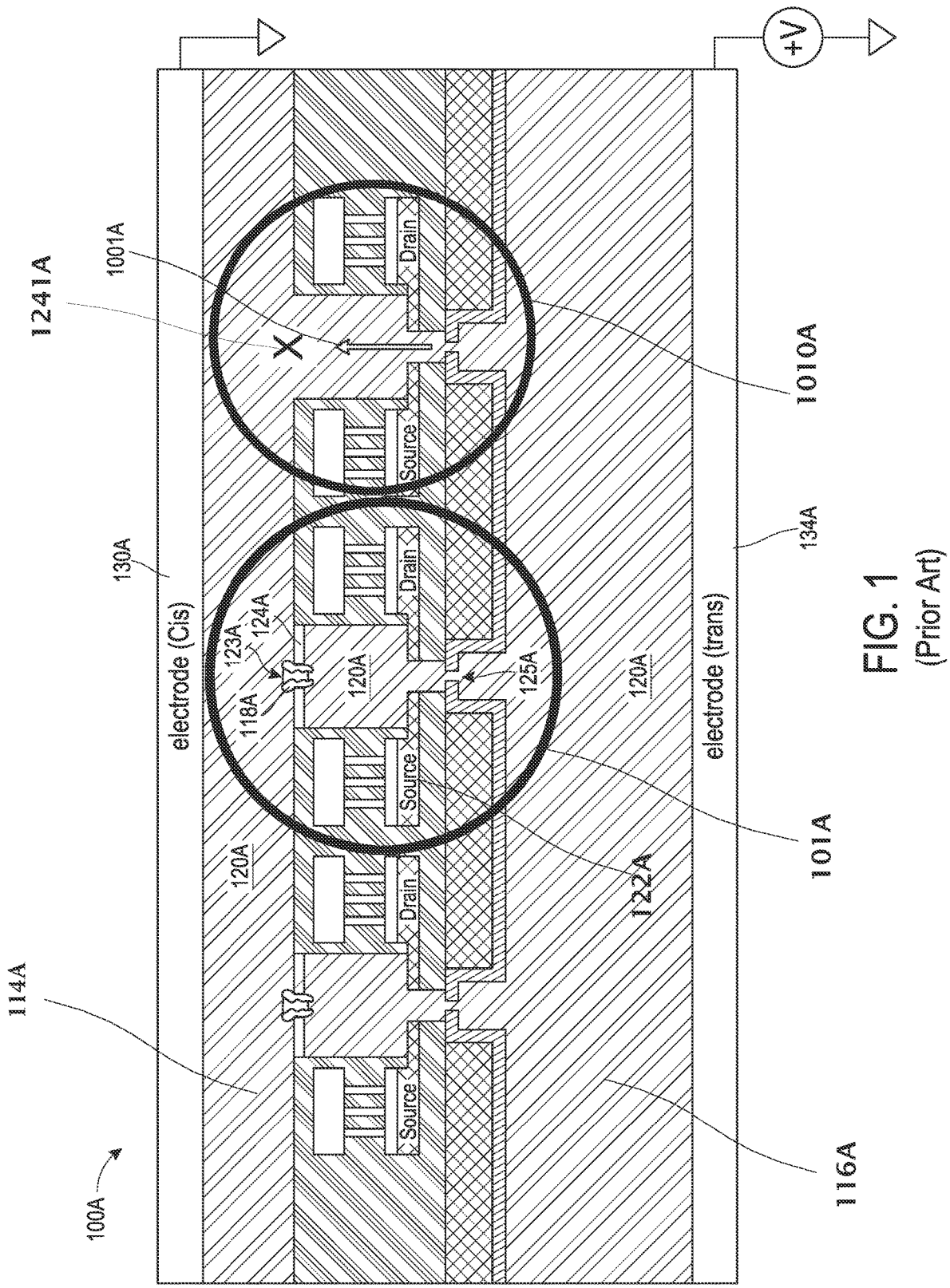
FIG. 1 schematically illustrates a prior art sequencing system having an array of connected nanopore unit cells.

All patents, applications, published applications and other publications referred to herein are incorporated herein by reference to the referenced material and in their entireties. If a term or phrase is used herein in a way that is contrary to or otherwise inconsistent with a definition set forth in the patents, applications, published applications and other publications that are herein incorporated by reference, the use herein prevails over the definition that is incorporated herein by reference.

Embodiments of the invention relate to nanopore sequencing systems which are designed to mitigate the effects of a non-functioning nanopore unit cell within a nanopore sensor array. One example of a non-functioning nanopore unit cell is failure to form a membrane separate the cis well and trans well (i.e., failing to "paint" a membrane over the membrane support). Another example of a non-functioning nanopore unit cell is rupture of a formed membrane. In certain embodiments, such as when the membrane has failed to form or has been ruptured, the non-functioning nanopore unit cell may allow a large current flow between a cis and a trans electrode in the array. In certain aspects, this large current flow may disrupt or affect the readings taken by other nanopore unit cells on the same array. In certain aspects, this large current flow may cause increased consumption or depletion of redox agents in faradaic systems or may cause improper absorption/desorption of ions and molecules in non-faradaic systems. Embodiments of the invention describe various techniques to mitigate the current flow in such a non-functioning nanopore unit cell.

In one embodiment, the nanopore unit cell comprises a component for generating a bubble within the nanopore chamber of the non-functioning cell. For example, the component may detect which nanopore unit cell has a large current flow, and then active a circuit which creates a bubble within the fluid located in the non-functioning cell. That bubble prevents or reduces all or part of a flow of current through the non-functioning cell since the bubble shuts off or limits a channel through the non-functioning nanopore unit cell. In some examples, the component that generates the bubble can include a switch connecting an electrode for electrolysis to a voltage source, or a switch connecting a heating element (e.g., a resistive heater) to a voltage source. In various embodiments, the bubble generating component may be a bubble generating electrode anywhere in the nanopore unit cell to interrupt ionic current flow and/or fluid flow between the cis electrode and trans electrode. For example, in certain embodiments, the bubble generating component is a bubble generating electrode disposed in the trans well.

In another embodiment, each cell of a nanopore array may have a MEMS device located between the cis electrode and the trans electrode, and configured to block or reduce current flow across the electrolyte fluid from one electrode to the other. For example, the MEMS device may be positioned in an open position and a closed position. When in a closed position, the valve blocks or reduces activated current cannot flow through the electrolyte chamber located within that non-functioning cell.

In another embodiment, each nanopore unit cell may have an elastomeric membrane which can be activated to block the current flow within the non-functioning cell. For example, the elastomeric membrane may be located adjacent to a heating element, such that activation of the heating element causes thermal expansion of fluid and/or gas formation underneath the membrane such that the membrane stretches towards, and physically blocks or limits a portion of the electrolyte channel within the non-functioning nanopore unit cell. The blockage can prevent current flow through the non-functioning nanopore unit cell.

While some embodiments of sequencing device described below have a dual pore configuration (where each of the nanopore unit cells of the sequencing device has a first nanoscale opening and a second nanoscale opening), it is to be understood that in other embodiments, a nanopore unit cell of the sequencing device may only have a single nanoscale opening connecting the cis well and the trans well (without a middle well).

Nanopore Sequencing Overview

Polynucleotides may be sequenced using a nanopore unit cell, or a nanopore sensor, based on electrical responses. In some embodiments, such unit cell may include a nanopore, a flow chamber containing a liquid, one or more electrodes, and an electronic circuit for measurement. In some cases, the nanopore may be a solid-state nanopore. In some cases, the nanopore may be a solid-state nanopore directly formed as a nanoscale opening in a membrane (e.g., silicon based, graphene, or polymer membrane). A polynucleotide may be dissolved in the liquid, e.g., an electrolyte. In some embodiments, application of a voltage via the one or more electrodes results in a driving force and/or a change in the electrical conditions that are suitable for driving translocation of the polynucleotide through the nanopore, for example from the "cis" side to the "trans" side. As the polynucleotide translocates through the nanopore, the polynucleotide may modulate the electrical properties of the nanopore, such that the nucleobase sequence of the polynucleotide can be identified. For example, the electrical current through the nanopore or the electrical resistance at the nanopore may be a function of the identity of the nucleobase of the polynucleotide at or near the nanopore.

In some cases, the nanopore may be a biological nanopore formed of peptides or polynucleotides and inserted in a lipid bilayer or a polymer membrane, e.g., a synthetic polymeric membrane. In an example, a protein nanopore is deposited in a lipid bilayer. A single-stranded DNA may pass, from the "cis" side, through the nanopore, to the "trans" side. Applying a voltage across the "cis" side to the "trans" side results in an ionic current through the nanopore. When a nucleotide of the DNA is in or near the nanopore, it may result in a unique ionic current blockade at the nanopore, and therefore a unique nanopore resistance depending on the identity of the nucleotide. By measuring the ionic current or the nanopore resistance, the nucleotide at or near the nanopore can be identified. It is to be understood that the disclosed nanopore sequencing technologies can be used in combination with any of the aforementioned scenarios.

In other embodiments, the DNA may not pass through the nanopore. A unique tag or label for a nucleotide in the DNA may pass through the nanopore. In one example, a tag or label of the nucleotide may be a particular sequence combination of nucleotides. When the tag or label is in or near the nanopore, it may result in a unique ionic current blockade at the nanopore, and therefore a unique nanopore resistance depending on the identity of the molecule of interest. By measuring the ionic current or the nanopore resistance, the tag or label at or near the nanopore, and therefore the corresponding nucleotide, can be identified. In some embodiments, sequencing of a target polynucleotide may involve nanopore sensing of (1) a single-stranded portion of the target polynucleotide; (2) a nucleic acid duplex of a portion of the target polynucleotide; (3) a label or tag that can be tethered or untethered to the target polynucleotide; or any combination thereof. It is to be understood that the disclosed nanopore sequencing technologies can be used in combination with any of the aforementioned scenarios.

In some embodiments, multiple nanopore sensors may be arranged in an array, each nanopore sensor corresponding to a sequencing channel for identifying the nucleobase sequence of a target polynucleotide. In some embodiments, each nanopore sensor may be independently accessed or controlled by a logic circuit. In some embodiments, a nanopore array is formed of a two-dimensional or a three-dimensional arrangement of nanopore sensors/nanopore unit cells. Each nanopore sensor/nanopore unit cell may be used to sequence a polynucleotide molecule. A nanopore array may therefore be used to sequence a plurality of polynucleotide molecules in parallel. In some cases, a nanopore array may be used to sequence a plurality of polynucleotide molecules substantially simultaneously. It is to be understood that the disclosed nanopore sequencing technologies can be used in combination with any of the aforementioned scenarios.

Embodiments of Sequencing Device

In some embodiments, the disclosed nanopore sequencing device includes a component that can generate a bubble sufficient to interrupt ionic current flow between the cis electrode and the trans electrode. The component that generates the bubble can include a switch connecting an electrode for electrolysis to a voltage source, or a switch connecting a heating element (e.g., a resistive heater) to a voltage source.

Figure 2A:
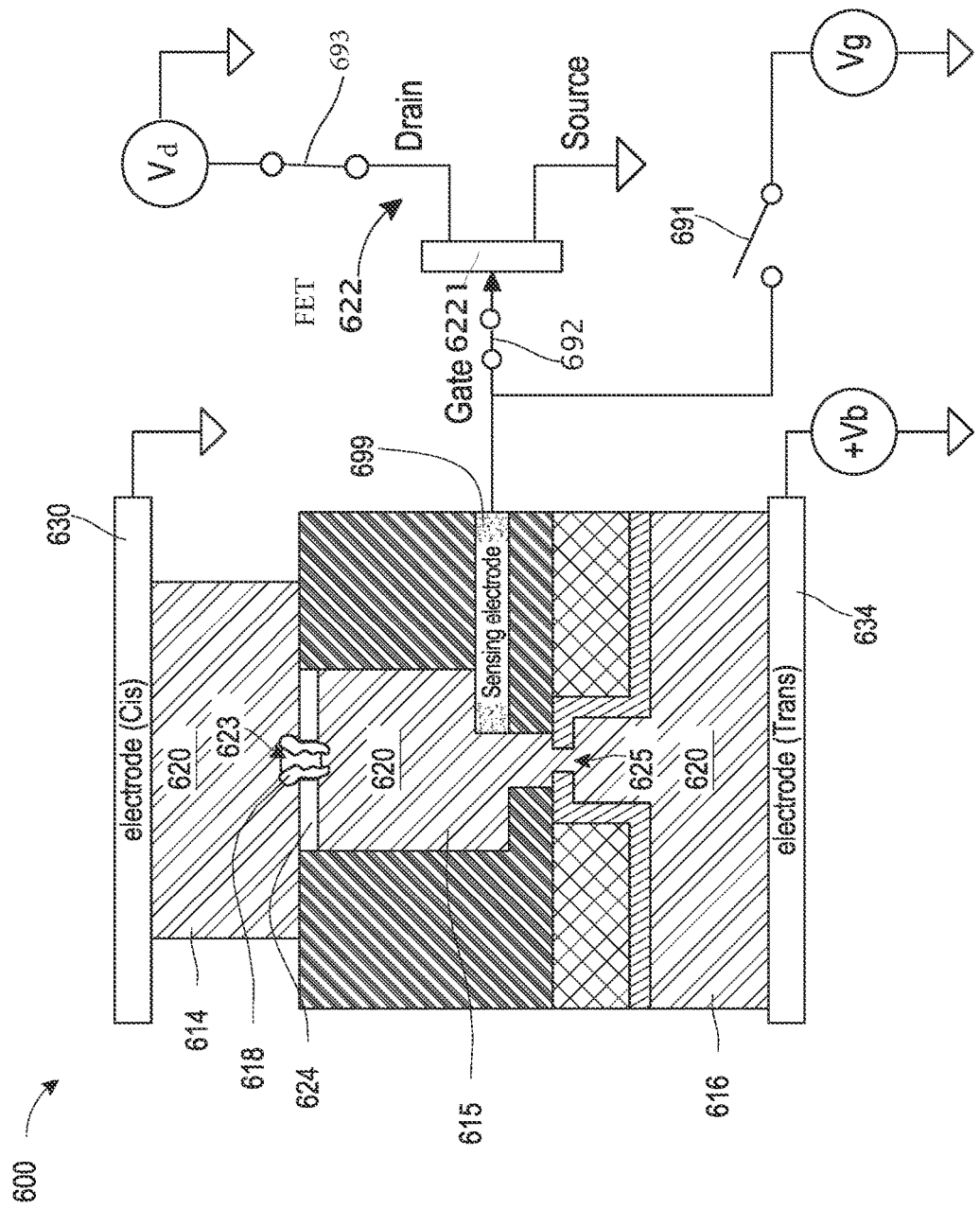
FIG. 2A and FIG. 2B schematically illustrate an embodiment of nanopore sequencing device with a mechanism to generate bubbles by way of electrolysis.
Figure 2B:
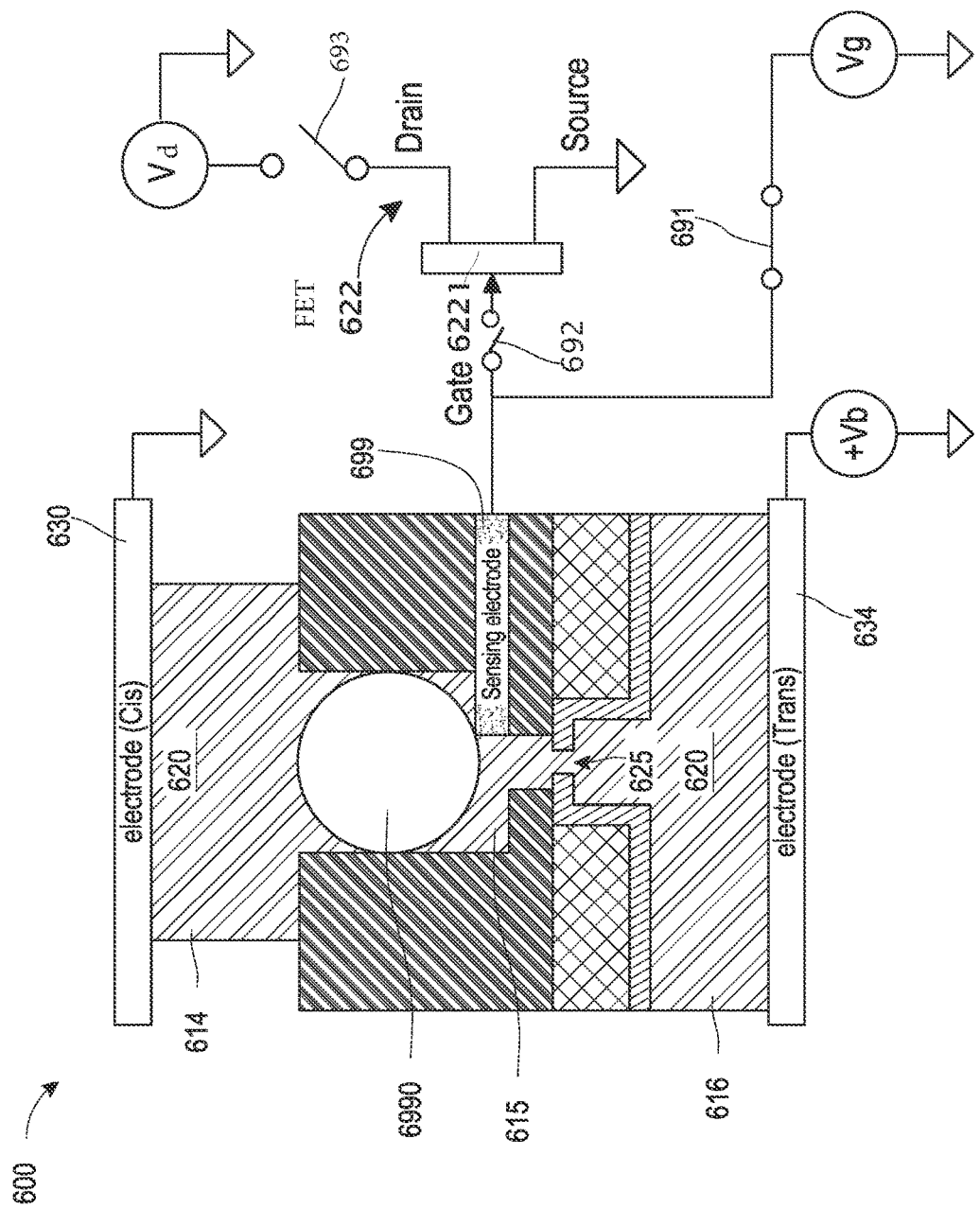

FIG. 2A and FIG. 2B schematically illustrate an embodiment of nanopore sequencing unit cell with a mechanism/component to generate bubbles. The nanopore unit cell 600 shown in FIG. 2A and FIG. 2B includes a cis well 614 associated with a cis electrode 630, a middle well 615, and a trans well 616 associated with a trans electrode 634. A solid-state pore/channel 625 may connect the middle well 615 and the trans well 616. A diameter of the cis and/or trans wells may be about a few centimeters, for example. The whole unit cell 600 may be filled with an electrolyte fluid 620. A field-effect transistor (FET) 622 may detect signal from the middle well 615 via a sensing electrode 699. For example, the sensing electrode 699 may be connected to the gate of the FET 622. In various examples, the FET 622 can be a nMOSFET, a pMOSFET, an enhancement-mode device, a depletion-mode device, a normally-on device or a normally-off device. One or more surfaces of the sensing electrode 699 may be exposed to the electrolyte in the middle well 615, and therefore the sensing electrode 699 can be used to transmit the electrical potential in the middle well 615 to the FET gate 6221, for example. In one embodiment, the sensing electrode 699 may be further connected to a voltage source Vg via a switch 691. A switch 691 can connect the voltage source Vg to the sensing electrode 699 on demand or depending on the signal detected by the FET. The voltage source Vg may be, for example, a 1.2V+ DC power supply. In some embodiments, the switch 691 may be a current-controlled switch and may be controlled by the source-drain electronic current of the FET 622 through an external control circuit. For example, when the FET source-drain current is relatively large, the switch 691 remains "disconnected" or "open"; and when the source-drain current is zero or near zero the switch 691 becomes "connected" or "closed". In other embodiments, the switch 691 may be a voltage-controlled switch and may be responsive to the source-drain current of the FET 622 through an external control circuit similar to that described in connection with FIG. 3C below. In some embodiments, the nanopore unit cell 600 may include an additional switch to prevent the FET from being driven into saturation. For example, an additional switch 692 which is "connected" when the switch 691 remains "disconnected" or "open", but can disconnect the FET gate 6221 from the voltage source Vg when the switch 691 becomes "connected" or "closed". Depending on the type of FET used and the polarity of the voltages applied to the FET, the additional switch 692 may prevent the FET from being driven into saturation. In alternative examples, an additional switch 693 can be arranged on the source or drain terminals of the FET to turn off the FET when the switch 691 becomes "connected" or "closed", preventing the FET from being driven into saturation. However, as will be explained in more detail below, the additional switch 692 or 693 may be optional.

The unit cell 600 may include a pore-forming protein 618 having a nanopore 623 residing in a membrane 624. The nanopore 623 may be fluidically connected in series with the solid-state pore/channel 625, and therefore the unit cell 600 can operate equivalently to a voltage divider. Additional details regarding the principle of operation of the unit cell 600 can be found in International Patent Application Number PCT/US2021/038125, the entirety of the disclosure is incorporated herein by reference. During a normal sequencing operation, the ionic flow/current between the cis and trans electrodes (through the nanopore) may be relatively small, e.g., about 0.1 pA to about 1 nA. During a normal sequencing operation, since the membrane and the protein nanopore of a unit cell are intact as shown in FIG. 2A, a bias voltage drop is established across the protein nanopore, or equivalently, between the middle well 615 and the cis electrode 630. The switch 691 is initially set in a "disconnected" or "open" state via the external control circuit when the operating point of the FET in the ON state. In some examples, when the FET is in the ON state, an electronic current flows between the source and drain of the FET. The electrical potential in the middle well established by the characteristic nanopore current as a target polynucleotide traverses through the nanopore 623 may be measured using the FET 622 by way of the sensing electrode 699.

In the scenario shown in FIG. 2B, the unit cell 600 is non-functioning. In one embodiment wherein the membrane is missing, the ionic flow/current between the cis and trans electrodes becomes relatively large, for example at least 50% larger than the largest ionic current during normal sequencing operation, e.g., about 1 nA to about 10 nA or 100 nA. Upon detecting such event by the FET 622 as a large change in the FET source-drain current, a bubble generation mechanism can be activated in order to isolate the unit cell 600 from the rest of the sequencing array. For example, if the membrane is missing, the cis well 614 and the middle well 615 become short-circuited, resulting in a low-resistance electrical connection between the cis electrode 630 and the FET gate 6221 (via the sensing electrode 699). Therefore, the FET gate 6221 is approximately set to the cis electrode bias (which is grounded), shifting the operating point of the FET to the OFF state, as described in connection with FIG. 3B-1 below. In some examples, when the FET is in the OFF state, the FET source-drain current will be zero or near zero, and thus setting the switch 691 to be "connected" or "closed" through the external control circuit. For example, the large change in the FET source-drain current indicative of such an event may be about a 20%, 30%, 40%, 50%, 60%, 70%, 80%, 90%, or any value therebetween, decrease in the source-drain current as the FET shifts from the ON state to the OFF state. However, in other examples using different types of FETs, a large change in the FET source-drain current indicative of a non-functioning cell may be either an increase or a decrease in the FET source-drain current, for example an increase or a decrease of about 20%, 30%, 40%, 50%, 60%, 70%, 80%, 90%, or any value therebetween. The switch 691 being "connected" or "closed" allows the sensing electrode 699 to receive a voltage from the voltage source Vg. As water is a component of the electrolyte 620, applying a sufficient voltage on the sensing electrode 699 can cause water electrolysis near the surface of the sensing electrode 699. Water electrolysis generates $H_2$ and $O_2$, producing a gas bubble 6990 containing $O_2$ that lodges in the middle well 615 and supplants the electrolyte fluid. A diameter of the bubble may be about a few microns, for example. Therefore, fluidic/ionic flow and electrical conduction between cis electrode 630 and trans electrode 634 can be blocked or limited because the bubble disrupts the ionic flow through the middle well 615. In some embodiments, certain reagents may be added to the electrolyte to facilitate bubble formation, and such reagents may alter the composition of the bubble. For example, metallic formates, e.g., potassium formate ($CHKO_2$), may be added to the electrolyte, and a bubble containing $CO_2$ may be formed upon electrolytic decomposition of $CHKO_2$.

In some embodiments, the switch 691 can be "connected" or "closed" for only a predetermined duration of time, by way of an external control logic, to allow the sensing electrode 699 to receive a voltage pulse. Applying a voltage pulse having a sufficient value/amplitude and a sufficient duration of time allows production of a gas bubble that lodges in the middle well and supplants the electrolyte. The bubble may remain lodged in the middle well even after the voltage pulse and the water electrolysis have ceased. In one example, the voltage pulse caused by closing switch 691 may be about 1.2V+ for a few seconds. In some embodiments, the voltage pulse may have an amplitude of about 0.5V+, 0.6V+, 0.7V+, 0.8V+, 0.9V+, 1.0V+, 1.3V+, 1.5 V+, 1.7 V+, 1.9 V+, 2.1 V+, or any value therebetween. In some embodiments, the voltage pulse may have a duration of about 0.5 second, 1 second, 2 seconds, 5 seconds, 8 seconds, 10 seconds, or any value therebetween.

In some embodiments, the sensing electrode 699 may be made of corrosion-resistant metals with respect to the electrolyte. The sensing electrode 699 may be made of platinum, iridium, ruthenium, palladium, tantalum, gold, TiN, or any combination thereof. In some embodiments, the additional switch 692 or 693 may be optional, depending on the type of FET used and the polarity of the voltages required for the FET. For example, the additional switch 692 or 693 may not be needed if the bias used to generate electrolysis can shut off the FET (i.e., the FET is turned off when the switch 691 connects the voltage source Vg to the sensing electrode 699). For example, the FET conducting channel or inversion layer between source and drain may be off or unavailable when Vg is applied to the FET gate.

Figure 2C:
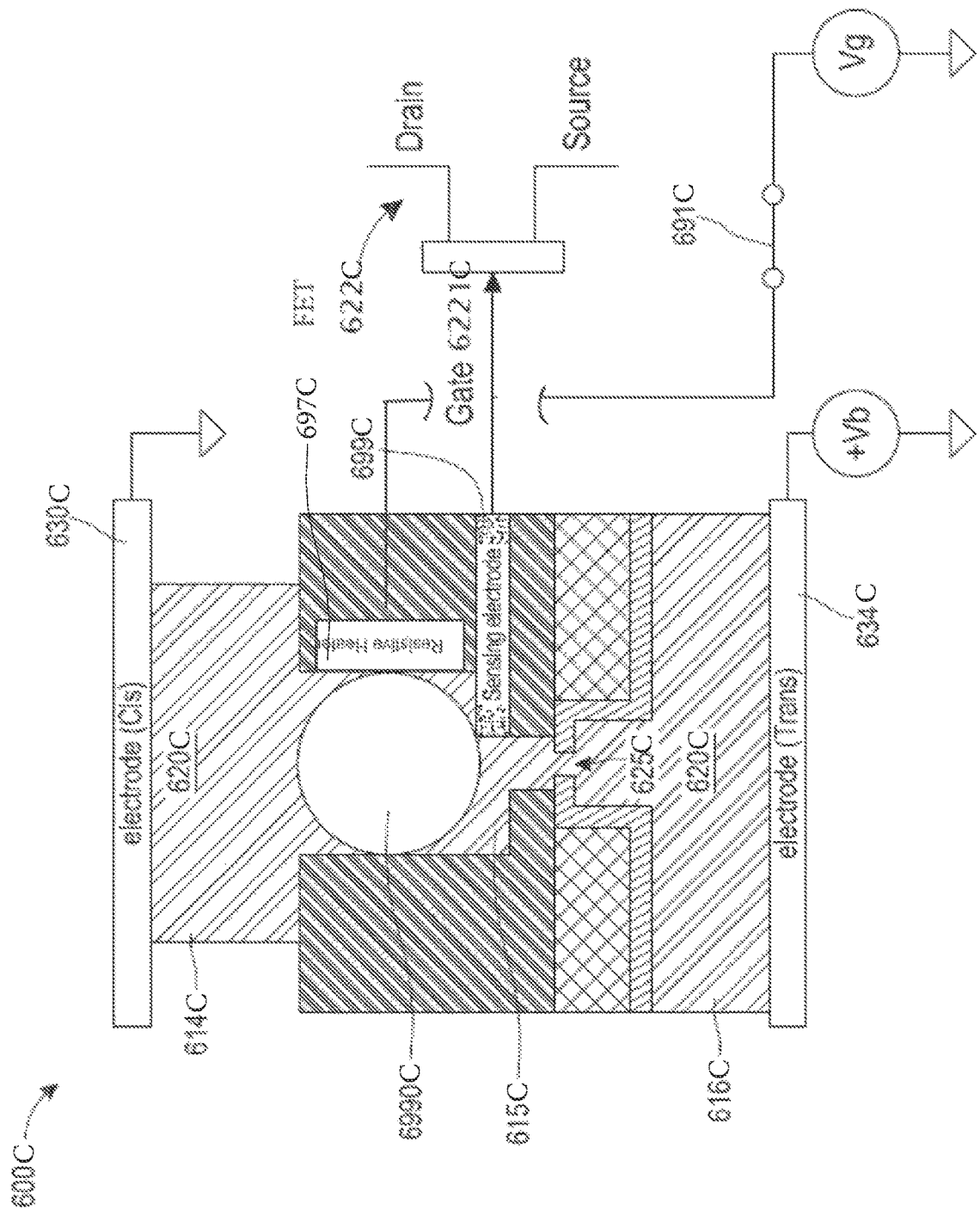
FIG. 2C schematically illustrate an embodiment of nanopore sequencing device with a mechanism to generate bubbles using a resistive heater.

FIG. 2C schematically illustrates another embodiment of a nanopore sequencing unit cell with a mechanism/component to generate bubbles. The nanopore unit cell 600C shown in FIG. 2C includes a cis well 614C associated with a cis electrode 630C, a middle well 615C, and a trans well 616C associated with a trans electrode 634C. A solid-state pore/channel 625C may connect the middle well 615C and the trans well 616C. A diameter of the cis and/or trans wells may be about a few centimeters, for example. The whole unit cell 600C may be filled with an electrolyte fluid 620C. A field-effect transistor (FET) 622C may detect a signal from the middle well 615C via a sensing electrode 699C. In various examples, the FET 622 can be a nMOSFET, a pMOSFET, an enhancement-mode device, a depletion-mode device, a normally-on device or a normally-off device. For example, a sensing electrode 699C may be connected to the gate of the FET 622C. One or more surfaces of the sensing electrode 699C may be exposed to the electrolyte in the middle well 615C, and therefore the sensing electrode 699C can be used to transmit the electrical potential in the middle well 615C to the FET gate 6221C, for example. In one embodiment, the nanopore unit cell 600C may further include a resistive heater 697C which is disposed adjacent to the middle well 615C. The resistive heater 697C may be connected to a voltage source Vg via a switch 691C. The switch 691C can connect the voltage source Vg to the resistive heater 697C on demand or depending on the signal detected by the FET. In some embodiments, the switch 691C may be a current-controlled switch and may be controlled by the source-drain electronic current of the FET 622C through an external control circuit. For example, when the FET source-drain current is relatively large, the switch 691C remains "disconnected" or "open"; and when the source-drain current is zero or near zero the switch 691C becomes "connected" or "closed". In other embodiments, the switch 691C may be a voltage-controlled switch and may be responsive to the source-drain current of the FET 622C through an external control circuit similar to that described in connection with FIG. 3C below.

The unit cell 600C may include a pore-forming protein 618C having a nanopore 623C residing in a membrane 624C. The nanopore 623C may be fluidically connected in series with the solid-state pore/channel 625C, and therefore the unit cell 600C can operate equivalently to a voltage divider. Additional details regarding the principle of operation of the unit cell 600C can be found in International Patent Application Number PCT/US2021/038125, the entirety of the disclosure is incorporated herein by reference. During a normal sequencing operation, the ionic flow/current between the cis and trans electrodes (through the nanopore) may be relatively small, e.g., about 0.1 pA to about 1 nA. During a normal sequencing operation, since the membrane and the protein nanopore of a unit cell are intact, a bias voltage drop is established across the protein nanopore, or equivalently, between the middle well 615C and the cis electrode 630C. The switch 691C is initially set in a "disconnected" or "open" state via the external control circuit when the operating point of the FET in the ON state. Thus, the resistive heater 697C is not connected with the voltage source Vg and is not heated. In some examples, when the FET 622C is in the ON state, an electronic current flows between the source and drain of the FET. The electrical potential in the middle well established by the characteristic nanopore current as a target polynucleotide traverses through the nanopore 623C may be measured using the FET 622C by way of the sensing electrode 699C.

If the unit cell 600C is non-functioning, for example when the membrane is missing, the ionic flow/current between the cis and trans electrodes becomes relatively large, for example at least 50% larger than the largest ionic current during normal sequencing operation, e.g., about 1 nA to about 10 nA or 100 nA. Upon detecting such event by the FET 622C as a large change in the FET source-drain current, bubble generation by way of the resistive heater can be activated in order to isolate the unit cell 600C from the rest of the sequencing array. For example, if the membrane is missing, the cis well 614C and the middle well 615C become short-circuited, resulting in a low-resistance electrical connection between the cis electrode 630C and the FET gate 6221C (via the sensing electrode 699C). Therefore, the FET gate 6221C is approximately set to the cis electrode bias (which is grounded), shifting the operating point of the FET to the OFF state, as described in connection with FIG. 3B-1 below. In some examples, when the FET is in the OFF state, the FET source-drain current will be zero or near zero, and thus setting the switch 691 to be "connected" or "closed" through the external control circuit. For example, the large change in the FET source-drain current indicative of such an event may be about a 20%, 30%, 40%, 50%, 60%, 70%, 80%, 90%, or any value therebetween, decrease in the source-drain current as the FET shifts from the ON state to the OFF state. However, in other examples using different types of FETs, a large change in the FET source-drain current indicative of a non-functioning cell may be either an increase or a decrease in the FET source-drain current, for example an increase or a decrease of about 20%, 30%, 40%, 50%, 60%, 70%, 80%, 90%, or any value therebetween. The switch 691 being "connected" or "closed" allows the resistive heater 697C to receive a voltage from the voltage source Vg and be heated. Sufficient heating of the electrolyte fluid locally may cause evaporation of the electrolyte solvent (e.g., water) or degasification of the air/gas originally dissolved in the electrolyte, resulting in a bubble 6990C that lodges in the middle well 615C and supplants the electrolyte fluid. A diameter of the bubble may be about a few microns, for example. Therefore, fluidic/ionic flow and electrical conduction between cis electrode 630C and trans electrode 634C can be blocked or limited because the bubble disrupts the ionic flow through the middle well 615C.

ADDITIONAL EMBODIMENTS

Figure 3A:
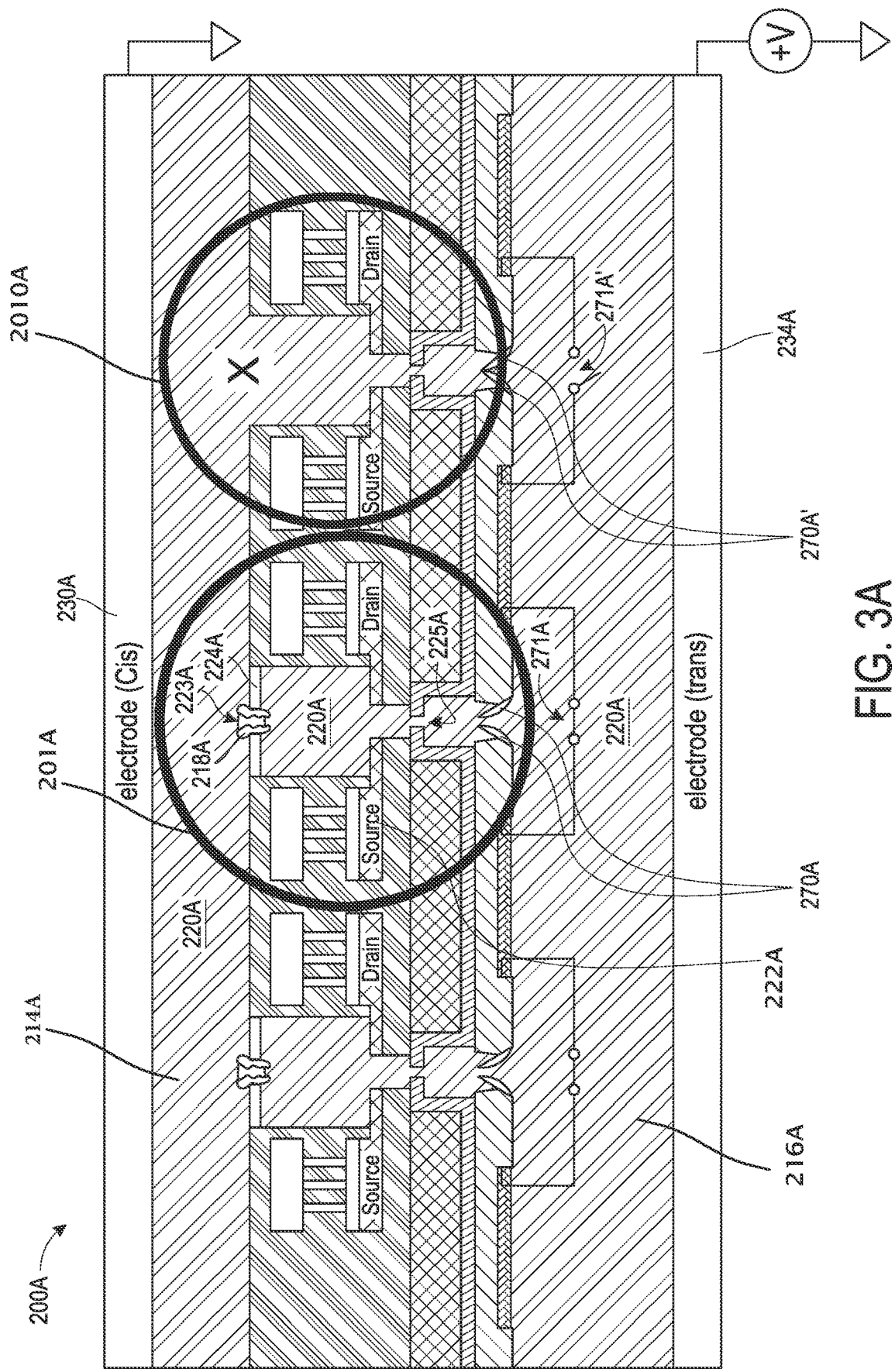
FIG. 3A schematically illustrates an example of nanopore sequencing array having MEMS valves.

FIG. 3A schematically illustrates an alternate embodiment of a nanopore sequencing array using MEMS valves to control current flow across individual nanopore unit cells. The nanopore array 200A shown in FIG. 3A includes multiple nanopore unit cells, and the unit cells share a common cis well 214A associated with a common cis electrode 230A and a common trans well 216A associated with a common trans electrode 234A. The whole array 200A may be filled with an electrolyte 220A. A unit cell 201A may include a pore-forming protein 218A having a nanopore 223A residing in a membrane 224A. The nanopore 123A may be fluidically connected in series with a solid-state pore/channel 225A. The characteristic current as the polynucleotide traverses through the nanopore 223A may be measured using a field-effect transistor (FET) 222A disposed between the nanopore 223A and the solid-state pore/channel 225A. The location of the FET 222A is indicated by its "Source" and "Drain" illustrated in FIG. 3A. A unit cell may further include a valve 270A and a switch 271A. The valve 270A may be disposed below the solid-state pore/channel 225A, as shown in FIG. 3A, or at any other position which can block the fluidic/ionic flow in a unit cell.

The switch 271A may be closed resulting in the valve 270A being open during a normal polynucleotide sequencing process. However, fluid and current flow through a unit cell may be disrupted when it is detected that the unit cell has a missing membrane or other non-functioning aspects resulting in a large current flow through the cell. For example, a unit cell 2010A with a ruptured/missing membrane is shown to the right of the unit cell 201A. As shown for non-functioning cell 2010A, the switch 271A' has been opened so that the valve 270A' is closed in order to shut off the fluid and current flow through this non-functioning unit cell 2010A.

In some embodiments, the valves may be electrostatically driven, individually addressable microelectromechanical valves (MEMS valves). Electrostatic actuation and control of the MEMS valves can make use of the attractive coulomb forces that develop between capacitively-coupled conductors differing in voltage levels. In some embodiments, the valves may be electrokinetic, pneumatic, Quake or Plunger valves. In some embodiments, the valves may be formed of stimuli-responsive polymers, e.g., redox-responsive materials/polymers/hydrogels that can change volume upon application of a current or voltage. Further details may be found in Fei, Shih-To, et al. "A redox responsive polymeric gel based on ionic crosslinking." Soft Matter 2.5 (2006): 397-401; and Che, Yunjiao, et al. "Double-crosslinked reversible redox-responsive hydrogels based on disulfide-thiol interchange." Journal of Polymer Science Part A: Polymer Chemistry 57.24 (2019): 2590-2601, the entirety of each of the disclosures is incorporated herein by reference. In some embodiments, the valves may be operated by electrostatic polymer actuation (ionic and electronic), piezo electric actuation, and shape memory actuation, such as described in Boustheen, A., et al. "Active microvalves for micro-fluidic networks in plastics-selecting suitable actuation schemes." 4th International Conference Multi-Material Micro Manufacture (4M2008), Cardiff. 2008, the entirety of the disclosure is incorporated herein by reference.

In some embodiments, the valves and the control circuitry for the switches may be fabricated in a separate wafer, which can be aligned and bonded to the wafer containing the nanopore sequencing array via wafer bonding techniques, e.g., bonding techniques used to produce stacked image sensors. In some embodiments, the valves may be fabricated by fabrication process flows described in Smith, L., and Hok, B., "A Silicon Self-Aligned Non-Reverse Valve," Proceedings of Transducers '91, the 1991 International Conference on Solid-State Sensors and Actuators, San Francisco, CA, Jun. 24-27, 1991, pp. 1049-1051, the entirety of the disclosure is incorporated herein by reference.

Example Control Logic

Figures 1, 3B:
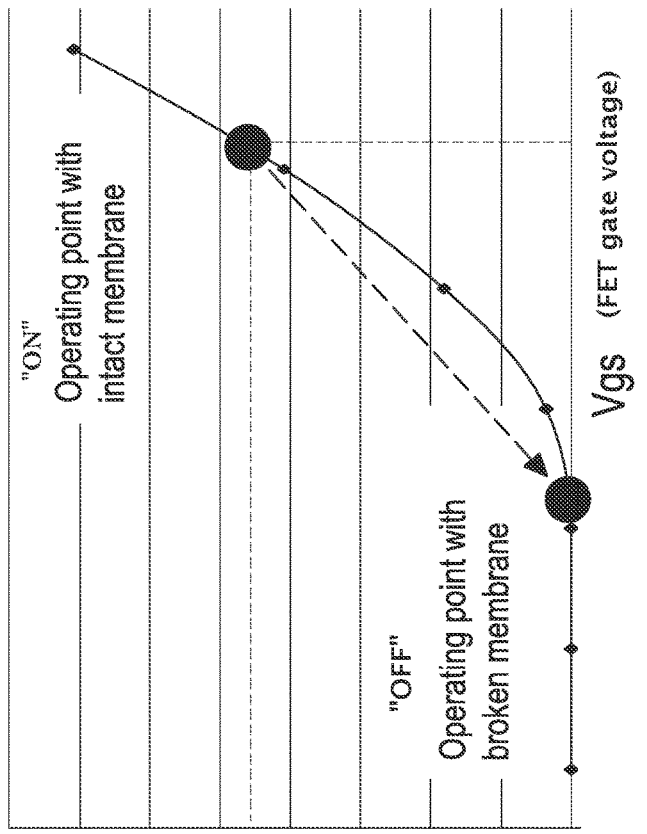

FIG. 3B-1, FIG. 3B-2 and FIG. 3C schematically illustrate an example of a line graph (FIG. 3B-1 and FIG. 3B-2) and control logic (FIG. 3C) which can be used to control the opening and closing of the valves shown in FIG. 3A. For example, at $t<t_0$ the membrane and the protein nanopore of a unit cell may be intact and in place, establishing a bias voltage drop across the protein nanopore. The FET source terminal and the cis electrode may both be grounded, and the FET gate terminal can sense the electrical potential in the middle well. When a bias voltage drop is across the protein nanopore (such as in the case of cell 201A in FIG. 3A), the FET gate voltage is large and the operating point of the FET is in the ON state, as illustrated in FIG. 3B-1. When the FET in the ON state, a stable current (e.g., can be in the nA or the µA range, depending on the FET geometry) flows between the source and drain of the FET.

Figures 2, 3B:
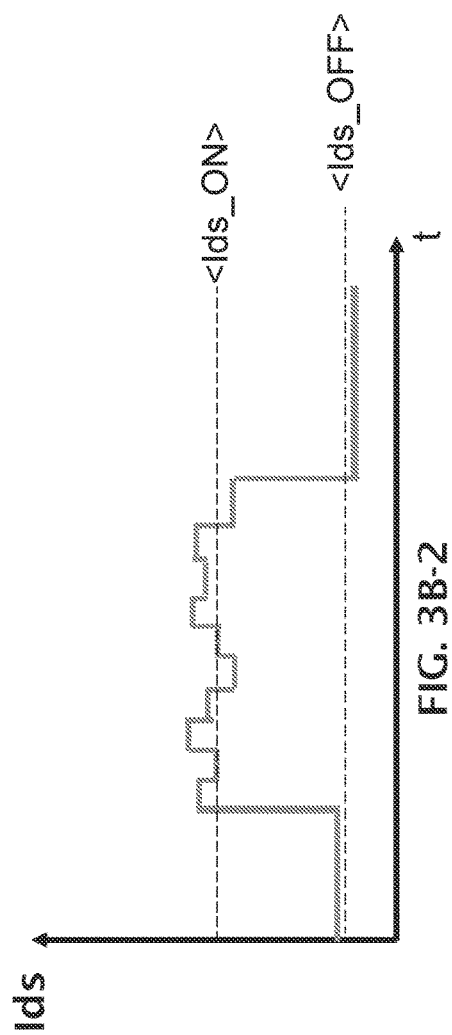

Assuming at $t=t_0$ the membrane of the unit cell breaks. This results in a direct low-resistance electrical connection between the gate of the FET and the cis electrode (such as in the case of cell 2010A in FIG. 3A), which shifts the operating point of the FET from the ON to the OFF state, as indicated by the arrow in FIG. 3B-1. When the FET in the OFF state, the current flowing between the source and drain of the FET will be zero or near zero (e.g., can be in the nA or the µA range, depending on the FET geometry). The sharp drop in source-drain current of the FET is indicative of such membrane failure and uniquely identifies the failed unit cell, and triggers isolation of the non-functioning cells. For example, the sharp drop in the FET source-drain current sufficient to allow detection of such an event may be about a 20%, 30%, 40%, 50%, 60%, 70%, 80%, 90%, or any value therebetween, decrease in the source-drain current. For example, FIG. 3B-2 shows that the medium FET source-drain current in the OFF state, <Ids_OFF>, is less than 40% of the medium FET source-drain current in the ON state, <Ids_ON>. In other examples, the FET can be a normally on device or a normally off device, and a large change in the FET source-drain current indicative of a non-functioning cell may be either an increase or a decrease in the FET source-drain current, for example an increase or a decrease of about 20%, 30%, 40%, 50%, 60%, 70%, 80%, 90%, or any value therebetween.

An external logic circuit can detect a sharp drop in the FET source-drain current in a unit cell, and shut down the unit cell, e.g., by triggering the disconnection of the switch that applies an electrostatic holding bias voltage on the corresponding valve. Removal of the holding bias may allow a normally open valve to snap back to a closed position, thus isolating the failed nanopore unit cell from the rest of the nanopore array.

Figure 3C:
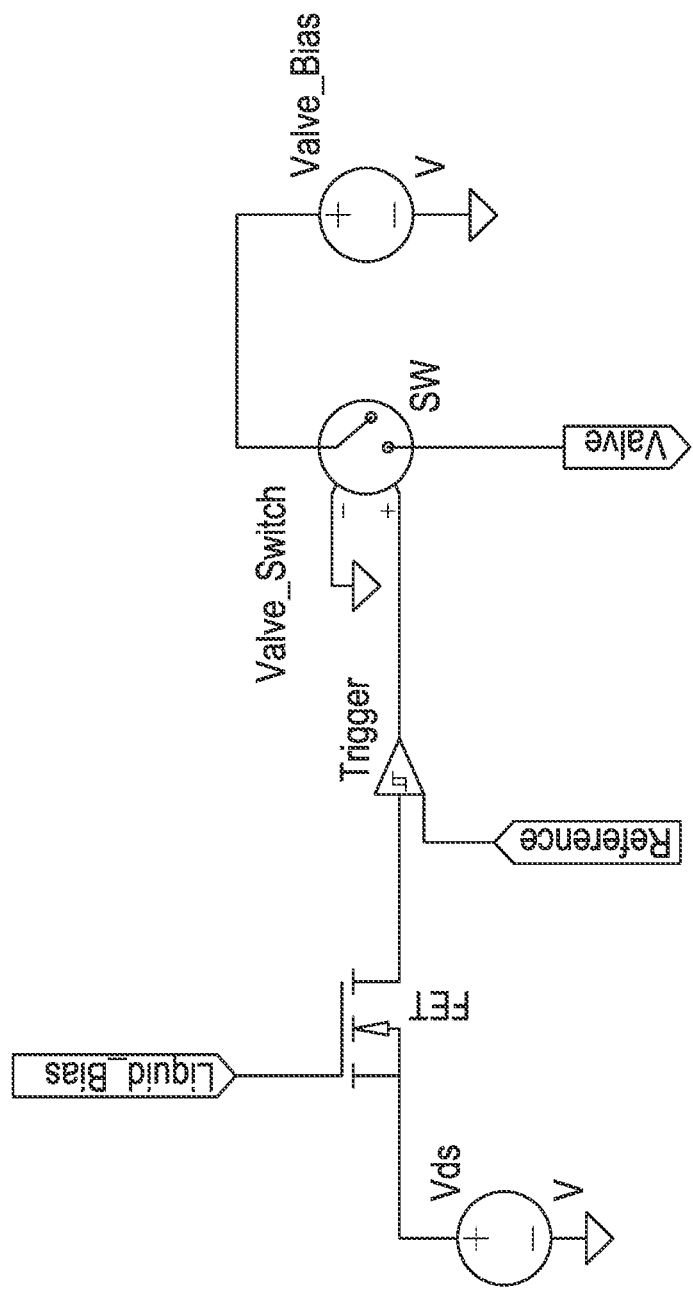

The external logic circuit can be implemented in software via a control FPGA or in hardware, for example via Schmitt triggers and voltage-controlled switches. As shown in FIG. 3C, an inverting Schmitt trigger ("Trigger") may be supplied with a reference bias voltage level ("Reference"). When the membrane corresponding to a FET breaks, the bias voltage of the liquid which is applied to the FET gate ("Liquid_Bias") drops to zero or near zero as it is now short-circuited with the cis electrode. When the FET gate drops to zero or near, the FET will be in the OFF state, and the FET source-drain current will be zero or near zero. As shown in FIG. 3C, the FET source-drain current is fed to the monitor line of the "Trigger". The bias voltage on the monitor line of the "Trigger" dropping below "Reference" causes the "Trigger" to deactivate, removing the bias voltage applied to the voltage-controlled switch ("Valve_Switch"). Removal of the bias applied to the voltage-controlled switch will disconnect the power supply "Valve_Bias" from the corresponding valve, causing the valve to close, and therefore can prevent ionic current from flowing through the failed unit cell.

While the control logic of FIG. 3B-1 and FIG. 3C are described in connection with the example sequencing array of FIG. 3A for illustrative purposes, it is to be understood that the control logic may be used in conjunction with any of the nanopore sequencing technologies disclosed herein.

Functionalities described herein, such as actuating a nanopore unit cell, signal detection from a nanopore unit cell, or accessing or controlling nanopore sensors in an array, can be implemented by electronic hardware, computer software, or combinations of both. Whether such functionalities are implemented by hardware or software depends upon the particular application and design constraints imposed on the overall system. The described functionalities can be implemented in varying ways for each particular application, but such implementation decisions should not be interpreted as causing a departure from the scope of the disclosure.

For example, functionalities described herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor or group of processors for performing the methods described herein may be of various types including programmable devices (e.g., CPLDs and FPGAs) and non-programmable devices such as gate array ASICs or general-purpose microprocessors.

A processor can also be implemented as a combination of computing devices, e.g., a combination of a DSP and a microprocessor, a plurality of microprocessors, one or more microprocessors in conjunction with a DSP core, or any other such configuration. For example, systems described herein may be implemented using a discrete memory chip, a portion of memory in a microprocessor, flash, EPROM, or other types of memory. In some examples, a hardware platform for providing a computational environment may be used. The hardware platform may comprise a processor (e.g., CPU) and a memory such as random access memory (RAM). In some embodiments, graphics processing units (GPUs) can be used. In some embodiments, hardware platforms for performing computational methods as described herein comprise one or more computer systems with one or more processors. In some embodiments, smaller computers are clustered together to yield a supercomputer network. The hardware platform may be specially constructed for the required purposes, or it may be a general-purpose computer (or a group of computers) selectively activated or reconfigured by a computer program and/or data structure stored in the computer. In some embodiments, a group of processors performs some or all of the described functionalities collaboratively (e.g., via a network or cloud computing) and/or in parallel.

Elements of the methods or processes described herein can be embodied in a software module executed by a processor. A software module can reside in RAM memory, flash memory, ROM memory, EPROM memory, EEPROM memory, registers, hard disk, a removable disk, a CD-ROM, or any other form of computer-readable storage medium. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

FURTHER ADDITIONAL EMBODIMENTS

FIG. 4A and FIG. 4B schematically illustrate an embodiment of nanopore sequencing unit cell having a heater and an elastomeric membrane for individual unit cell isolation. The nanopore unit cell 300 shown in FIG. 4A and FIG. 4B includes a cis well 314 associated with a cis electrode 330, a middle well 315 formed in an interlayer dielectric 368, and a trans well 316 associated with a trans electrode 334. The trans well 316 includes a narrower region 317. A fluidic tunnel 321 connects the middle well 315 and the narrower region 317. The whole unit cell 300 may be filled with an electrolyte 320. The unit cell may include a pore-forming protein 318 having a nanopore 323 residing in a membrane 324. The membrane 324 may be anchored to the interlayer dielectric 368. The nanopore 323 may be fluidically connected in series with a solid-state pore/channel 325. The solid-state pore 325/channel is within a base substrate 362 and fluidically connects the fluidic tunnel 321 and the narrower region 317. The characteristic current as the polynucleotide traverses through the nanopore 223 may be measured using a field-effect transistor (FET) 322 disposed between the nanopore 223 and the solid-state pore/channel 225. The FET 322 includes a source 350, a drain 352, and a FET channel that connects the source to the drain. A thin layer of gate oxide 356 is grown around the FET channel, and a surface 355 of the FET gate oxide 356 may be fluidically exposed to the electrolyte 320 in the middle well 315. The unit cell 300 may further include an elastomeric membrane 391 formed in the trans electrode 334. A heater 392 may be used to control the elastomeric membrane 391 to block/unblock the fluidic/ionic flow in the unit cell.

The elastomeric membrane 391 can operate as an elastomeric valve for individual unit cell isolation. The elastomeric membrane 391 may be formed of an elastomeric material. In some embodiments, the heater 392 may be connected to an external power supply via a voltage-controlled switch, which is controlled in a way similar to that described in connection with FIGS. 3A-3C. For example, during a normal sequencing scenario illustrated in FIG. 4A, the voltage-controlled switch is in a "disconnected" state, the heater 392 is off, and the elastomeric membrane 391 is not expanded. In a scenario illustrated in FIG. 4B where the membrane 324 has malfunctioned, the source-drain current of the FET 322 drops significantly. The dropped FET source-drain current triggers the voltage-controlled switch to turn to a "connected" state, such that the external power supply is connected to the heater 392. Following turning on of the heater 392, a fluid in a cavity between the heater 392 and the elastomeric membrane 391 may be heated and expanded, thus expanding the elastomeric membrane 391. The expanded elastomeric membrane 391 blocks fluidic/ionic flow of the nanopore unit cell 300.

Figure 5A:
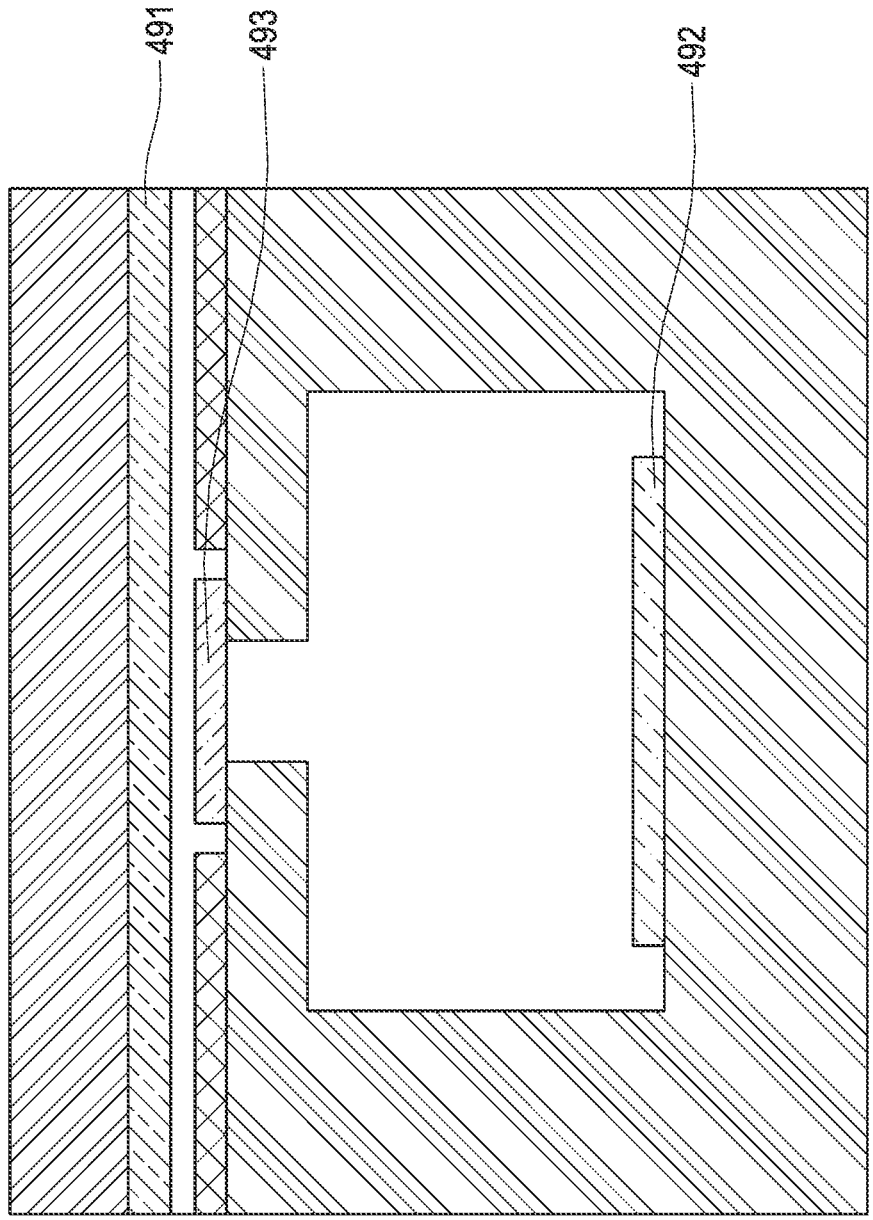
FIG. 5A and FIG. 5B schematically illustrate an example flap used in connection with the embodiment of nanopore sequencing device shown in FIG. 4A and FIG. 4B.
Figure 5B:
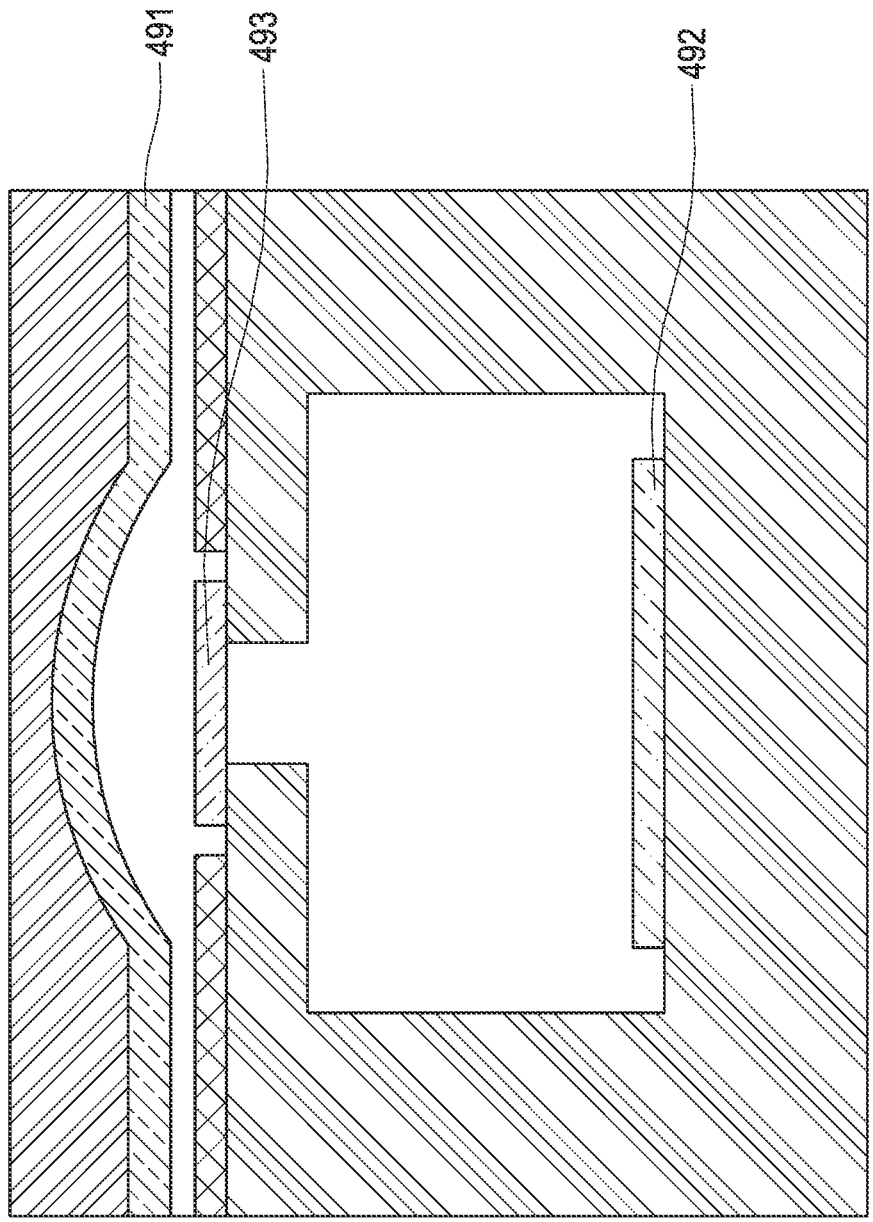

In some cases, there may be a need for reducing thermal cross talk between neighboring nanopore unit cells, so a heater may only be allowed to stay on for a while. FIG. 5A and FIG. 5B schematically illustrate a flap which is added to the embodiment of nanopore sequencing unit cell shown in FIG. 4A and FIG. 4B. As shown in FIG. 5A and FIG. 5B, a flap 493 is added between the heater 492 and the elastomeric membrane 491. Adding the flap can create a one-way valve. For example, while FIG. 5A shows a normal sequencing scenario, FIG. 5B shows that in a scenario where the fluid in the cavity between the heater 492 and the elastomeric membrane 491 has be heated and expanded, extra fluid accumulates between the flap 493 and the elastomeric membrane 491. Thus, the one-way valve can cause the elastomeric membrane 491 to remain in the expanded state by holding the extra fluid between the flap 493 and the elastomeric membrane 491, even after the heater is no longer on.

Figure 6:
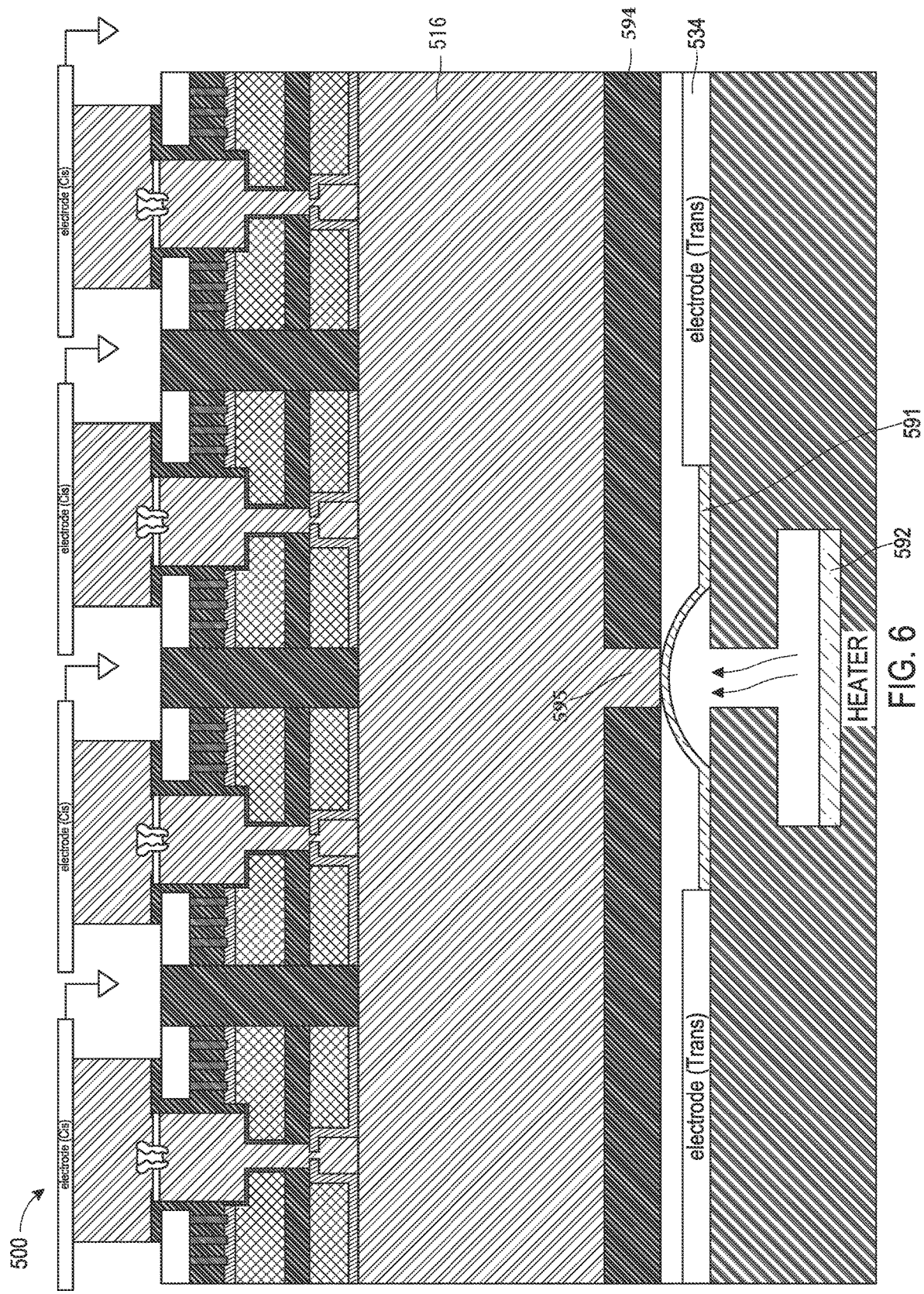
FIG. 6 schematically illustrates an example of sequencing array where a group of nanopore unit cells are controlled by one elastomeric valve.

In some cases, because an elastomeric membrane may have a limited range of motion and a significant footprint, one elastomeric valve may be used to control a group of nanopore unit cells. FIG. 6 schematically illustrates an example of sequencing array 500 where a group of nanopore unit cells are controlled by one elastomeric membrane 591 and a corresponding heater 592. The elastomeric membrane 591 may be formed in the trans electrode 534. A solid structure 594 may separate the trans electrode 534 and the trans well 516 except at the hole 595. When the elastomeric membrane 591 is not expanded, the trans well 516 can connect to a larger well having electrolyte via the hole 595. If one of the unit cells in this group fails, the heater 592 is turned on and thermal expansion of the elastomeric membrane 591 can block the hole 595. Thus, a single valve can isolate a group of unit cells and reduce the impact of this group of unit cells on the whole sequencing system.

In some embodiments, the elastomeric membrane 591 is disposed in an opening of the trans electrode 534 and attached to the trans electrode material. For example, there may be a circular opening in the trans electrode above the heater 592. The boundary of the elastomeric membrane 591 may be attached to the boundary of the circular opening.

EXPERIMENTAL RESULTS

FIGS. 7A-H schematically illustrate bubble formation by way of an example electrolysis mechanism described in connection with FIG. 2A and FIG. 2B. FIG. 7A and FIG. 7B schematically illustrates the device used in the experiment. FIG. 7A schematically illustrates a cross-sectional view of the device. A well 703 was formed in a patterned layer 702 comprising a SU8 photoresist polymer formed to a thickness of about 20 micron. The well 703 was associated with an individually addressable electrode lead 701 comprising Au (gold). FIG. 7B is a schematic drawing that shows a plan view of the device. The device included an array of six wells 703 that were each 50 micron in width; the wells 703 were formed in the SU8 polymer layer 702; and each well 703 was associated with an individually addressable Au electrode lead 701.

An experiment was performed to demonstrate the formation, growth, removal and re-formation of a bubble in a well of the device utilizing the water electrolysis process. FIGS. 7C-H show the same device as in FIG. 7A and FIG. 7B. FIG. 7C is a schematic drawing of the array of six wells shown in FIG. 7B at the start of the experiment, when the wells were filled with water. A voltage bias was applied on the Au electrode lead of only the well of the unit 7001. After some time, a bubble formed in the well of unit 7001, as evident by the dark area 709D in the schematic drawing of FIG. 7D. The bubble in the well of unit 7001 further grew with time, as evident by the expanding dark areas 709E and 709F in the schematic drawings of FIG. 7E and FIG. 7F. Subsequently, the array of wells were flushed with the organic solvent comprising isopropyl alcohol (IPA), and as shown in the schematic drawing of FIG. 7G, the bubble was removed from the well of unit 7001. Following removal of the bubble from the well of unit 7001, the array of wells were re-filled with water, and a voltage bias was re-applied to only the well of unit 7001. As a result, a bubble 709H re-formed in the well of unit 7001, as shown in the schematic drawing of FIG. 7H.

FURTHER EXAMPLES

Example 1. A device, comprising at least one sequencing channel, the channel comprising:
  a cis well associated with a cis electrode;
  a middle well associated with a sensing electrode;
  a trans well associated with a trans electrode;
  a first nanoscale opening fluidically connecting the cis well and the middle well; and
  a second nanoscale opening fluidically connecting the middle well and the trans well,
  wherein the sensing electrode is operably connected to a voltage source via a switch.

Example 2. The device as defined in Example 1, wherein the middle well comprises an electrolyte and the sensing electrode is configured to electrolyze the electrolyte when the switch is positioned to connect the voltage source to the sensing electrode.

Example 3. The device of Example 2, wherein electrolyzing the electrolyte results in at least one bubble to form in the electrolyte.

Example 4. The device of Example 3, wherein electrolyzing the electrolyte results in a bubble forming in the fluid and interrupting the flow of ions from the cis electrode to the trans electrode.

Example 5. The device as defined in any of Examples 1-4, wherein the switch is configured to connect the voltage source to the sensing electrode when the device detects that the first nanoscale opening has malfunctioned.

Example 6. The device as defined in any of Examples 1-5, wherein the sensing electrode is formed of a corrosion-resistant material.

Example 7. The device as defined in any of Examples 1-6, wherein the sensing electrode is further operably connected to a voltage detector.

Example 8. The device as defined in any of Examples 1-7, wherein the sensing electrode is further operably connected to a field effect transistor (FET).

Example 9. The device as defined in Example 8, wherein the sensing electrode is operably connected to a gate terminal of the FET.

Example 10. The device as defined in any of Examples 1-9, wherein the first nanoscale opening comprises a nanopore.

Example 11. The device as defined in Examples 10, wherein the nanopore extends through a membrane positioned between the cis well and the middle well.

Example 12. The device as defined in Example 11, wherein the membrane is formed of lipid, silicon, graphene, a solid-state material, a synthetic material, a biomimetic equivalent of lipid, or any combination thereof.

Example 13. The device as defined in Example 11, wherein the nanopore is an orifice in a structure formed of one or more polynucleotides, one or more polypeptides, one or more types of biopolymers, one or more carbon nanotubes, one or more types of solid-state materials, or any combination thereof disposed in the membrane.

Example 14. The device as defined in any of Examples 1-13, wherein the second nanoscale opening is arranged in a fluidic tunnel or a porous structure.

Example 15. The device as defined in any of Examples 1-14, wherein device comprises a wafer having a plurality of sequencing channels configured to allow a biopolymer to translocate substantially horizontally or substantially vertically with respect to a surface of the wafer.

Example 16. A method of using the device as defined in any of Examples 1-15, the method comprising:
  introducing an electrolyte into the cis well, the middle well, and the trans well;
  applying a voltage between the cis electrode and the trans electrode; and
  measuring an electric potential of the electrolyte in the middle well,
  wherein an electrical resistance of the first nanoscale opening varies in response to an identity of one or more monomers in a biopolymer, the one or more monomers being near or at the first nanoscale opening.

Example 17. A device, comprising:
  a cis well associated with a cis electrode;
  a middle well;
  a trans well associated with a trans electrode;

a first nanoscale opening fluidically connecting the cis well and the middle well;
a second nanoscale opening fluidically connecting the middle well and the trans well; and
a heater positioned to heat fluid in the trans well.

Example 18. The device of Example 17, wherein the heater is a resistive heater configured to generate a thermal bubble within the trans well.

Example 19. The device of Example 18, wherein the device is configured to activate the heater when the device detects that the first nanoscale opening has malfunctioned.

Example 20. A device, comprising:
a cis well associated with a cis electrode;
a middle well;
a trans well associated with a trans electrode;
a first nanoscale opening fluidically connecting the cis well and the middle well;
a second nanoscale opening fluidically connecting the middle well and the trans well; and
a valve configured to block a fluidic connection within the device.

Example 21. The device as defined in Example 20, wherein the valve is configured to block the fluidic connection when the device detects that the first nanoscale opening has malfunctioned.

Example 22. The device as defined in any of Examples 20-21, wherein the valve is configured to block the fluidic connection between the middle well and the trans well.

Example 23. The device as defined in any of Examples 20-22, wherein the valve is actuated electrostatically, electrokinetically, electrochemically, electromagnetically, pneumatically, thermally, or any combination thereof.

Example 24. The device as defined in any of Examples 20-23, wherein the valve comprises an elastomeric membrane, a silicon membrane, a flap, a cavity configured to store fluid, a heater, one or more electrodes, or any combination thereof.

Example 25. The device as defined in any of Examples 20-24, wherein at least a portion of the valve is formed of stimuli-responsive polymers, redox-responsive materials, hydrogels, or any combination thereof.

Example 26. The device as defined in Example 25, wherein at least a portion of the valve changes volume in response to an electrical current.

Example 27. The device as defined in any of Examples 20-26, further comprising a field effect transistor (FET).

Example 28. The device as defined in Example 27, wherein a gate terminal of the FET is operably connected to the middle well.

Example 29. A method of using the device as defined in any of Examples 20-28, the method comprising:
introducing an electrolyte into the cis well, the middle well, and the trans well;
applying a voltage between the cis electrode and the trans electrode; and
measuring an electric potential of the electrolyte in the middle well,
wherein an electrical resistance of the first nanoscale opening varies in response to an identity of one or more monomers in a biopolymer, the one or more monomers being near or at the first nanoscale opening.

In one aspect, the disclosed technology relates to a device, comprising at least one sequencing channel comprising electrolyte, the channel comprising: a cis well associated with a cis electrode; a middle well associated with a sensing electrode; a trans well associated with a trans electrode; a first nanoscale opening fluidically connecting the cis well and the middle well; a second nanoscale opening fluidically connecting the middle well and the trans well; and a component for generating a bubble sufficient to interrupt current flow between the cis electrode and the trans electrode.

In some embodiments, the component comprises a switch operably connecting the sensing electrode to a voltage source.

In some embodiments, the middle well comprises an electrolyte and the sensing electrode is configured to electrolyze the electrolyte to generate the bubble when the switch is positioned to connect the voltage source to the sensing electrode.

In some embodiments, electrolyzing the electrolyte results in at least one bubble to form in the middle well.

In some embodiments, the sensing electrode is further operably connected to a gate terminal of a field effect transistor (FET), and the FET is turned off when the switch connects the voltage source to the sensing electrode.

In some embodiments, the switch is configured to connect the voltage source to the sensing electrode when the device detects that the first nanoscale opening has malfunctioned.

In some embodiments, the sensing electrode is formed of a corrosion-resistant material.

In some embodiments, the sensing electrode is further operably connected to a voltage detector.

In some embodiments, the sensing electrode is further operably connected to a field effect transistor (FET).

In some embodiments, the sensing electrode is operably connected to a gate terminal of the FET.

In some embodiments, the first nanoscale opening comprises a nanopore.

In some embodiments, the nanopore extends through a membrane positioned between the cis well and the middle well.

In some embodiments, the membrane is formed of lipid, silicon, graphene, a solid-state material, a synthetic material, a biomimetic equivalent of lipid, or any combination thereof.

In some embodiments, the nanopore is an orifice in a structure formed of one or more polynucleotides, one or more polypeptides, one or more types of biopolymers, one or more carbon nanotubes, one or more types of solid-state materials, or any combination thereof disposed in the membrane.

In some embodiments, the second nanoscale opening is arranged in a fluidic tunnel or a porous structure.

In some embodiments, the device comprises a wafer having a plurality of sequencing channels configured to allow a biopolymer to translocate substantially horizontally or substantially vertically with respect to a surface of the wafer.

In some embodiments, the component comprises a heating element positioned to heat the electrolyte to generate the bubble.

In some embodiments, the heating element is activated by a switch operably connecting the heating element to a voltage source.

In some embodiments, the heating element is a resistive heater configured to generate the bubble within the middle well.

In some embodiments, the device is configured to activate the heating element when the device detects that the first nanoscale opening has malfunctioned.

In one aspect, the disclosed technology relates to a device, comprising: a cis well associated with a cis electrode; a middle well; a trans well associated with a trans electrode; a first nanoscale opening fluidically connecting the cis well and the middle well; a second nanoscale opening fluidically connecting the middle well and the trans well; and a valve configured to block a fluidic connection within the device.

In some embodiments, the valve is configured to block the fluidic connection when the device detects that the first nanoscale opening has malfunctioned.

In some embodiments, the valve is configured to block the fluidic connection between the middle well and the trans well.

In some embodiments, the valve is actuated electrostatically, electrokinetically, electrochemically, electromagnetically, pneumatically, thermally, or any combination thereof.

In some embodiments, the valve comprises an elastomeric membrane, a silicon membrane, a flap, a cavity configured to store fluid, a heating element, one or more electrodes, or any combination thereof.

In some embodiments, at least a portion of the valve is formed of stimuli-responsive polymers, redox-responsive materials, hydrogels, or any combination thereof.

In some embodiments, at least a portion of the valve changes volume in response to an electrical current.

In some embodiments, the device further comprises a field effect transistor (FET).

In some embodiments, a gate terminal of the FET is operably connected to the middle well.

In one aspect, the disclosed technology relates to a method of isolating a unit in an array for polynucleotide sequencing, the method comprising: detecting that a unit in the array is non-functioning; and in response to the detection, isolating the unit by disrupting an ionic flow in the unit.

In some embodiments, disrupting an ionic flow in the unit comprises generating a bubble by way of electrolysis of a fluid in the unit.

In some embodiments, disrupting an ionic flow in the unit comprises generating a bubble by way of heating of a fluid in the unit.

In some embodiments, disrupting an ionic flow in the unit comprises closing an electrostatic valve in the unit by way of electrically actuating the electrostatic valve.

In some embodiments, disrupting an ionic flow in the unit comprises closing an elastomeric valve in the unit by way of thermally actuating the elastomeric valve.

In some embodiments, detecting that a unit in the array is non-functioning comprises detecting that an electrical potential in a predetermined compartment of the unit is below a threshold.

In one aspect, the disclosed technology relates to a device, comprising an array of nanopore cells, each of the nanopore cells comprising: a cis well; a trans well; a membrane support between the cis well and the trans well; and a bubble generating electrode disposed in the trans well.

In some embodiments, a switch operably connects the bubble generating electrode to a voltage source.

In some embodiments, the trans well comprises an electrolyte and the bubble generating electrode is configured to electrolyze the electrolyte to generate the bubble when the switch is positioned to connect the voltage source to the bubble generating electrode.

In some embodiments, electrolyzing the electrolyte results in at least one bubble to form in the trans well.

In some embodiments, the bubble generating electrode is further operably connected to a gate terminal of a field effect transistor (FET), and wherein the FET is turned off when the switch connects the voltage source to the bubble generating electrode.

In some embodiments, the switch is configured to connect the voltage source to the bubble generating electrode when the device detects that the membrane support has malfunctioned.

In some embodiments, the bubble generating electrode is formed of a corrosion-resistant material.

In some embodiments, the bubble generating electrode is further operably connected to a voltage detector.

In some embodiments, a nanopore extends through the membrane support.

In some embodiments, the nanopore is an orifice in a structure formed of one or more polynucleotides, one or more polypeptides, one or more types of biopolymers, one or more carbon nanotubes, one or more types of solid-state materials, or any combination thereof disposed in the membrane.

In some embodiments, the membrane support is formed of lipid, silicon, graphene, a solid-state material, a synthetic material, a biomimetic equivalent of lipid, or any combination thereof.

In some embodiments, the device comprises a wafer having a plurality of sequencing channels configured to allow a biopolymer to translocate substantially horizontally or substantially vertically with respect to a surface of the wafer.

In one aspect, the disclosed technology relates to a device, comprising an array of nanopore cells, each of the nanopore cells comprising: a cis well; a trans well; a membrane support between the cis well and the trans well; and a heating element positioned to heat an electrolyte to generate a bubble.

In some embodiments, the heating element is activated by a switch operably connecting the heating element to a voltage source.

In some embodiments, the heating element is a resistive heater configured to generate the bubble within the trans well.

In some embodiments, the device is configured to activate the heating element when the device detects that the membrane support has malfunctioned.

In one aspect, the disclosed technology relates to a device, comprising: a cis well; a trans well; a membrane support between the cis well and the trans well; and a valve configured to block a fluidic connection within the device.

In some embodiments, the valve is configured to block the fluidic connection when the device detects that the membrane support has malfunctioned.

In some embodiments, the valve is actuated electrostatically, electrokinetically, electrochemically, electromagnetically, pneumatically, thermally, or any combination thereof.

In some embodiments, the valve comprises an elastomeric membrane, a silicon membrane, a flap, a cavity configured to store fluid, a heating element, one or more electrodes, or any combination thereof.

In some embodiments, at least a portion of the valve is formed of stimuli-responsive polymers, redox-responsive materials, hydrogels, or any combination thereof.

In some embodiments, at least a portion of the valve changes volume in response to an electrical current.

In some embodiments, the device further includes a field effect transistor (FET).

In one aspect, the disclosed technology relates to a method of isolating a unit in an array for polynucleotide sequencing, the method comprising: detecting that a unit in the array is non-functioning; and in response to the detection, isolating the unit by disrupting an ionic flow in the unit.

In some embodiments, disrupting an ionic flow in the unit comprises generating a bubble by way of electrolysis of a fluid in the unit.

In some embodiments, disrupting an ionic flow in the unit comprises generating a bubble by way of heating of a fluid in the unit.

In some embodiments, disrupting an ionic flow in the unit comprises closing an electrostatic valve in the unit by way of electrically actuating the electrostatic valve.

In some embodiments, disrupting an ionic flow in the unit comprises closing an elastomeric valve in the unit by way of thermally actuating the elastomeric valve.

In some embodiments, detecting that a unit in the array is non-functioning comprises detecting that an electrical potential in a predetermined compartment of the unit is below a threshold.

Definitions

All technical and scientific terms used herein have the same meaning as commonly understood to one of ordinary skill in the art to which this disclosure belongs unless clearly indicated otherwise.

As used herein, the singular forms "a", "and", and "the" include plural referents unless the context clearly dictates otherwise. Thus, for example, reference to "a sequence" may include a plurality of such sequences, and so forth.

The terms comprising, including, containing and various forms of these terms are synonymous with each other and are meant to be equally broad. Moreover, unless explicitly stated to the contrary, examples comprising, including, or having an element or a plurality of elements having a particular property may include additional elements, whether or not the additional elements have that property.

As used herein, the terms "fluidically connecting," "fluid communication," "fluidically coupled," and the like refer to two spatial regions being connected together such that a fluid (e.g., liquid or gas) may flow between the two spatial regions. For example, a cis well/wells may be fluidically connected to a trans well/wells by way of a middle well and/or a nanochannel, such that a fluid, e.g., at least a portion of an electrolyte, may flow between the connected wells.

As used herein, the term "ionic connection" and the like refer to two spatial regions being connected together such that certain species of ions may flow between the two spatial regions.

As used herein, the term "electric connection" and the like refer to two spatial regions being connected together such that electrons, holes, ions or other charge carriers may flow between the two spatial regions.

If an electrolyte flows between two connected wells, ions and electric currents may also flow between the connected wells. In some examples, two spatial regions may be in fluid/ionic/electric communication through first and second nanoscale openings, or through one or more valves, restrictors, or other fluidic components that are to control or regulate a flow of fluid, ions or electric current through a system.

As used herein, the term "operably connected" refers to a configuration of elements, wherein an action or reaction of one element affects another element, but in a manner that preserves each element's functionality.

As used herein, the term "membrane" refers to a non-permeable or semi-permeable barrier or other sheet that separates two liquid/gel chambers (e.g., a cis well and a fluidic cavity or reservoir) which can contain the same compositions or different compositions therein. The permeability of the membrane to any given species depends upon the nature of the membrane. In some examples, the membrane may be non-permeable to ions, to electric current, and/or to fluids. For example, a lipid membrane may be impermeable to ions (i.e., does not allow any ion transport therethrough), but may be at least partially permeable to water (e.g., water diffusivity ranges from about 40 μm/s to about 100 μm/s). For another example, a synthetic/solid-state membrane, one example of which is silicon nitride, may be impermeable to ions, electric charge, and fluids (i.e., the diffusion of all of these species is zero). Any membrane may be used in accordance with the present disclosure, as long as the membrane can include a transmembrane nanoscale opening and can maintain a potential difference across the membrane. The membrane may be a monolayer or a multilayer membrane. A multilayer membrane includes two or more layers, each of which is a non-permeable or semi-permeable material.

The membrane may be formed of materials of biological or non-biological origin. A material that is of biological origin refers to material derived from or isolated from a biological environment such as an organism or cell, or a synthetically manufactured version of a biologically available structure (e.g., a biomimetic material).

An example membrane that is made from the material of biological origin includes a monolayer formed by a bola-lipid. Another example membrane that is made from the material of biological origin includes a lipid bilayer. Suitable lipid bilayers include, for example, a membrane of a cell, a membrane of an organelle, a liposome, a planar lipid bilayer, and a supported lipid bilayer. A lipid bilayer can be formed, for example, from two opposing layers of phospholipids, which are arranged such that their hydrophobic tail groups face towards each other to form a hydrophobic interior, whereas the hydrophilic head groups of the lipids face outwards towards the aqueous environment on each side of the bilayer. Lipid bilayers also can be formed, for example, by a method in which a lipid monolayer is carried on an aqueous solution/air interface past either side of an aperture that is substantially perpendicular to that interface. The lipid is normally added to the surface of an aqueous electrolyte solution by first dissolving it in an organic solvent and then allowing a drop of the solvent to evaporate on the surface of the aqueous solution on either side of the aperture. Once the organic solvent has at least partially evaporated, the solution/air interfaces on either side of the aperture are physically moved up and down past the aperture until a bilayer is formed. Other suitable methods of bilayer formation include tip-dipping, painting bilayers, and patch-clamping of liposome bilayers. Any other methods for obtaining or generating lipid bilayers may also be used.

A material that is not of biological origin may also be used as the membrane. Some of these materials are solid-state materials and can form a solid-state membrane, and others of these materials can form a thin liquid film or membrane. The solid-state membrane can be a monolayer, such as a coating or film on a supporting substrate (i.e., a solid support), or a freestanding element. The solid-state membrane can also be a composite of multilayered materials in a sandwich configuration. Any material not of biological origin may be used, as long as the resulting membrane can include a transmembrane nanoscale opening and can maintain a potential difference across the membrane. The membranes may include organic materials, inorganic materials, or both. Examples of suitable solid-state materials include, for example, microelectronic materials, insulating materials (e.g., silicon nitride ($Si_3N_4$), aluminum oxide ($Al_2O_3$), hafnium oxide (HfO$_2$), tantalum pentoxide (Ta$_2$O$_5$), silicon oxide (SiO$_2$), etc.), some organic and inorganic polymers (e.g., polyamide, plastics, such as polytetrafluoroethylene (PTFE), or elastomers, such as two-component addition-cure silicone rubber), and glasses. In addition, the solid-state membrane can be made from a monolayer of graphene, which is an atomically thin sheet of carbon atoms densely packed into a two-dimensional honeycomb lattice, a multilayer of graphene, or one or more layers of graphene mixed with one or more layers of other solid-state materials. A graphene-containing solid-state membrane can include at least one graphene layer that is a graphene nanoribbon or graphene nanogap, which can be used as an electrical sensor to characterize the target polynucleotide. It is to be understood that the solid-state membrane can be made by any suitable method, for example, chemical vapor deposition (CVD). In an example, a graphene membrane can be prepared through either CVD or exfoliation from graphite. Examples of suitable thin liquid film materials that may be used include diblock copolymers or triblock copolymers, such as amphiphilic PMOXA-PDMS-PMOXA ABA triblock copolymers.

As used herein, the term "nanopore" is intended to mean a hollow structure discrete from, or defined in, and extending across the membrane. The nanopore permits ions, electric current, and/or fluids to cross from one side of the membrane to the other side of the membrane. For example, a membrane that inhibits the passage of ions or water-soluble molecules can include a nanopore structure that extends across the membrane to permit the passage (through a nanoscale opening extending through the nanopore structure) of the ions or water-soluble molecules from one side of the membrane to the other side of the membrane. The diameter of the nanoscale opening extending through the nanopore structure can vary along its length (i.e., from one side of the membrane to the other side of the membrane), but at any point is on the nanoscale (i.e., from about 1 nm to about 100 nm, or to less than 1000 nm). Examples of the nanopore include, for example, biological nanopores, solid-state nanopores, and biological and solid-state hybrid nanopores.

As used herein, the term "diameter" is intended to mean a longest straight line inscribable in a cross-section of a nanoscale opening through a centroid of the cross-section of the nanoscale opening. It is to be understood that the nanoscale opening may or may not have a circular or substantially circular cross-section. Further, the cross-section may be regularly or irregularly shaped.

As used herein, the term "biological nanopore" is intended to mean a nanopore whose structure portion is made from materials of biological origin. Biological origin refers to a material derived from or isolated from a biological environment such as an organism or cell, or a synthetically manufactured version of a biologically available structure. Biological nanopores include, for example, polypeptide nanopores and polynucleotide nanopores.

As used herein, the term "polypeptide nanopore" is intended to mean a protein/polypeptide that extends across the membrane, and permits ions, electric current, biopolymers such as DNA or peptides, or other molecules of appropriate dimension and charge, and/or fluids to flow therethrough from one side of the membrane to the other side of the membrane. A polypeptide nanopore can be a monomer, a homopolymer, or a heteropolymer. Structures of polypeptide nanopores include, for example, an α-helix bundle nanopore and a β-barrel nanopore. Example polypeptide nanopores include aerolysin, α-hemolysin, *Mycobacterium smegmatis* porin A (MspA), gramicidin A, maltoporin, OmpF, OmpC, PhoE, Tsx, F-pilus, etc. The protein α-hemolysin is found naturally in cell membranes, where it acts as a pore for ions or molecules to be transported in and out of cells. *Mycobacterium smegmatis* porin A (MspA) is a membrane porin produced by Mycobacteria, which allows hydrophilic molecules to enter the bacterium. MspA forms a tightly interconnected octamer and transmembrane beta-barrel that resembles a goblet and contains a central pore.

A polypeptide nanopore can be synthetic. A synthetic polypeptide nanopore includes a protein-like amino acid sequence that does not occur in nature. The protein-like amino acid sequence may include some of the amino acids that are known to exist but do not form the basis of proteins (i.e., non-proteinogenic amino acids). The protein-like amino acid sequence may be artificially synthesized rather than expressed in an organism and then purified/isolated.

As used herein, the term "polynucleotide nanopore" is intended to include a polynucleotide that extends across the membrane, and permits ions, electric current, and/or fluids to flow from one side of the membrane to the other side of the membrane. A polynucleotide pore can include, for example, a polynucleotide origami (e.g., nanoscale folding of DNA to create the nanopore).

Also as used herein, the term "solid-state nanopore" is intended to mean a nanopore whose structure portion is defined by a solid-state membrane and includes materials of non-biological origin (i.e., not of biological origin). A solid-state nanopore can be formed of an inorganic or organic material. Solid-state nanopores include, for example, silicon nitride nanopores, silicon dioxide nanopores, and graphene nanopores.

The nanopores disclosed herein may be hybrid nanopores. A "hybrid nanopore" refers to a nanopore including materials of both biological and non-biological origins. An example of a hybrid nanopore includes a polypeptide-solid-state hybrid nanopore and a polynucleotide-solid-state nanopore.

In some embodiments, the nanopore may comprise a solid-state material, such as silicon nitride, modified silicon nitride, silicon, silicon oxide, or graphene, or a combination thereof. In some embodiments, the nanopore is a protein that forms a tunnel upon insertion into a bilayer, membrane, thin film, or solid-state aperture. In some embodiments, the nanopore is comprised in a lipid bilayer. In some embodiments, the nanopore is comprised in an artificial membrane comprising a mycolic acid. The nanopore may be a *Mycobacterium smegmatis* porin (Msp) having a vestibule and a constriction zone that define the tunnel. The Msp porin may be a mutant MspA porin. In some embodiments, amino acids at positions 90, 91, and 93 of the mutant MspA porin are each substituted with asparagine. Some embodiments may comprise altering the translocation velocity or sequencing sensitivity by removing, adding, or replacing at least one amino acid of an Msp porin. A "mutant MspA porin" is a multimer complex that has at least or at most 70, 75, 80, 85, 90, 95, 98, or 99 percent or more identity, or any range derivable therein, but less than 100%, to its corresponding wild-type MspA porin and retains tunnel-forming capability. A mutant MspA porin may be recombinant protein. Optionally, a mutant MspA porin is one having a mutation in the constriction zone or the vestibule of a wild-type MspA porin. Optionally, a mutation may occur in the rim or the outside of the periplasmic loops of a wild-type MspA porin. A mutant MspA porin may be employed in any embodiment described herein.

A "vestibule" refers to the cone-shaped portion of the interior of an Msp porin whose diameter generally decreases from one end to the other along a central axis, where the narrowest portion of the vestibule is connected to the constriction zone. A vestibule may also be referred to as a "goblet." The vestibule and the constriction zone together define the tunnel of an Msp porin. A "constriction zone" or the "readhead" refers to the narrowest portion of the tunnel of an Msp porin, in terms of diameter, that is connected to the vestibule. The length of the constriction zone may range from about 0.3 nm to about 2 nm. Optionally, the length is about, at most about, or at least about 0.3, 0.4, 0.5, 0.6, 0.7, 0.8, 0.9, 1.0, 1.1, 1.2, 1.3, 1.4, 1.5, 1.6, 1.7, 1.8, 1.9, 2, or 3 nm, or any range derivable therein. The diameter of the constriction zone may range from about 0.3 nm to about 2 nm. Optionally, the diameter is about, at most about, or at least about 0.3, 0.4, 0.5, 0.6, 0.7, 0.8, 0.9, 1.0, 1.1, 1.2, 1.3, 1.4, 1.5, 1.6, 1.7, 1.8, 1.9, 2, or 3 nm, or any range derivable therein. A "tunnel" refers to the central, empty portion of an Msp porin that is defined by the vestibule and the constriction zone, through which a gas, liquid, ion, or analyte may pass. A tunnel is an example of an opening of a nanopore.

Various conditions such as light and the liquid medium that contacts a nanopore, including its pH, buffer composition, detergent composition, and temperature, may affect the behavior of the nanopore, particularly with respect to its conductance through the tunnel as well as the movement of an analyte with respect to the tunnel, either temporarily or permanently.

In some embodiments, the disclosed system for nanopore sequencing comprises an Msp porin having a vestibule and a constriction zone that define a tunnel, wherein the tunnel is positioned between a first liquid medium and a second liquid medium, wherein at least one liquid medium comprises an analyte polynucleotide, and wherein the system is operative to detect a property of the analyte. The system may be operative to detect a property of any analyte comprising subjecting an Msp porin to an electric field such that the analyte interacts with the Msp porin. The system may be operative to detect a property of the analyte comprising subjecting the Msp porin to an electric field such that the analyte electrophoretically translocates through the tunnel of the Msp porin. In some embodiments, the system comprises an Msp porin having a vestibule and a constriction zone that define a tunnel, wherein the tunnel is positioned in a lipid bilayer between a first liquid medium and a second liquid medium, and wherein the only point of liquid communication between the first and second liquid media occurs in the tunnel. Moreover, any Msp porin described herein may be comprised in any system described herein.

The system may further comprise one or more temperature regulating devices in communication with the fluid or electrolyte. The system described herein may be operative to translocate an analyte through an Msp porin tunnel either electrophoretically or otherwise.

As used herein, the term "nanopore sequencer" refers to any of the devices disclosed herein that can be used for nanopore sequencing. In the examples disclosed herein, during nanopore sequencing, the nanopore is immersed in example(s) of the electrolyte disclosed herein and a potential difference is applied across the membrane. In an example, the potential difference is an electric potential difference or an electrochemical potential difference. An electrical potential difference can be imposed across the membrane via a voltage source that injects or administers current to at least one of the ions of the electrolyte contained in the cis well or one or more of the trans wells. An electrochemical potential difference can be established by a difference in ionic composition of the cis and trans wells in combination with an electrical potential. The different ionic composition can be, for example, different ions in each well or different concentrations of the same ions in each well.

The application of the potential difference across a nanopore may force the translocation of a nucleic acid through the nanopore. One or more signals are generated that correspond to the translocation of the nucleotide through the nanopore. Accordingly, as a target polynucleotide, or as a mononucleotide or a probe derived from the target polynucleotide or mononucleotide, transits through the nanopore, the current across the membrane changes due to base-dependent (or probe dependent) blockage of the constriction, for example. The signal from that change in current can be measured using any of a variety of methods. Each signal is unique to the species of nucleotide(s) (or probe) in the nanopore, such that the resultant signal can be used to determine a characteristic of the polynucleotide. For example, the identity of one or more species of nucleotide(s) (or probe) that produces a characteristic signal can be determined.

As used herein, a "reporter" is composed of one or more reporter elements. Reporters include what are known as "tags" and "labels." Reporters serve to parse the genetic information of the target nucleic acid. "Encode" or "parse" are verbs referring to transferring from one format to another, and refers to transferring the genetic information of target template base sequence into an arrangement of reporters.

As used herein, a "peptide" refers to two or more amino acids joined together by an amide bond (that is, a "peptide bond"). Peptides comprise up to or include 50 amino acids. Peptides may be linear or cyclic. Peptides may be α, β, γ, δ, or higher, or mixed. Peptides may comprise any mixture of amino acids as defined herein, such as comprising any combination of D, L, α, β, γ, δ, or higher amino acids.

As used herein, a "protein" refers to an amino acid sequence having 51 or more amino acids.

As used herein, a "polymerase" is an enzyme generally used for joining 3'-OH 5'-triphosphate nucleotides, oligomers, and their analogs. Polymerases include, but are not limited to, DNA-dependent DNA polymerases, DNA-dependent RNA polymerases, RNA-dependent DNA polymerases, RNA-dependent RNA polymerases, T7 DNA polymerase, T3 DNA polymerase, T4 DNA polymerase, T7 RNA polymerase, T3 RNA polymerase, SP6 RNA polymerase, DNA polymerase I, Klenow fragment, *Thermophilus aquaticus* DNA polymerase, Tth DNA polymerase, VentR® DNA polymerase (New England Biolabs), Deep VentR® DNA polymerase (New England Biolabs), Bst DNA Polymerase Large Fragment, Stoeffel Fragment, 90N DNA Polymerase, 90N DNA polymerase, Pfu DNA Polymerase, TfI DNA Polymerase, Tth DNA Polymerase, RepliPHI Phi29 Polymerase, Tli DNA polymerase, eukaryotic DNA polymerase beta, telomerase, Therminator™ polymerase (New England Biolabs), KOD HiFi™ DNA polymerase (Novagen), KOD1 DNA polymerase, Q-beta replicase, terminal transferase, AMV reverse transcriptase, M-MLV reverse transcriptase, Phi6 reverse transcriptase, HIV-1 reverse transcriptase, novel polymerases discovered by bioprospecting, and polymerases cited in US 2007/0048748, U.S. Pat. Nos. 6,329,178, 6,602,695, and 6,395,524 (incorporated by reference). These polymerases include wild-type, mutant isoforms, and genetically engineered variants.

As used herein, a "nucleotide" includes a nitrogen containing heterocyclic base, a sugar, and one or more phosphate groups. Nucleotides are monomeric units of a nucleic acid sequence. Examples of nucleotides include, for example, ribonucleotides or deoxyribonucleotides. In ribonucleotides (RNA), the sugar is a ribose, and in deoxyribonucleotides (DNA), the sugar is a deoxyribose, i.e., a sugar lacking a hydroxyl group that is present at the 2' position in ribose. The nitrogen containing heterocyclic base can be a purine base or a pyrimidine base. Purine bases include adenine (A) and guanine (G), and modified derivatives or analogs thereof. Pyrimidine bases include cytosine (C), thymine (T), and uracil (U), and modified derivatives or analogs thereof. The C-1 atom of deoxyribose is bonded to N-1 of a pyrimidine or N-9 of a purine. The phosphate groups may be in the mono-, di-, or tri-phosphate form. These nucleotides are natural nucleotides, but it is to be further understood that non-natural nucleotides, modified nucleotides or analogs of the aforementioned nucleotides can also be used.

As used herein, "nucleobase" is a heterocyclic base such as adenine, guanine, cytosine, thymine, uracil, inosine, xanthine, hypoxanthine, or a heterocyclic derivative, analog, or tautomer thereof. A nucleobase can be naturally occurring or synthetic. Non-limiting examples of nucleobases are adenine, guanine, thymine, cytosine, uracil, xanthine, hypoxanthine, 8-azapurine, purines substituted at the 8 position with methyl or bromine, 9-oxo-N6-methyladenine, 2-aminoadenine, 7-deazaxanthine, 7-deazaguanine, 7-deaza-adenine, N4-ethanocytosine, 2,6-diaminopurine, N6-ethano-2,6-diaminopurine, 5-methylcytosine, 5-(C3-C6)-alkynylcytosine, 5-fluorouracil, 5-bromouracil, thiouracil, pseudoisocytosine, 2-hydroxy-5-methyl-4-triazolopyridine, isocytosine, isoguanine, inosine, 7,8-dimethylalloxazine, 6-dihydrothymine, 5,6-dihydrouracil, 4-methyl-indole, ethenoadenine and the non-naturally occurring nucleobases described in U.S. Pat. Nos. 5,432,272 and 6,150,510 and PCT applications WO 92/002258, WO 93/10820, WO 94/22892, and WO 94/24144, and Fasman ("Practical Handbook of Biochemistry and Molecular Biology", pp. 385-394, 1989, CRC Press, Boca Raton, LO), all herein incorporated by reference in their entireties.

The term "nucleic acid" or "polynucleotide" refers to a deoxyribonucleotide or ribonucleotide polymer in either single- or double-stranded form, and unless otherwise limited, encompasses known analogs of natural nucleotides that hybridize to nucleic acids in manner similar to naturally occurring nucleotides, such as peptide nucleic acids (PNAs) and phosphorothioate DNA. Unless otherwise indicated, a particular nucleic acid sequence includes the complementary sequence thereof. Nucleotides include, but are not limited to, ATP, dATP, CTP, dCTP, GTP, dGTP, UTP, TTP, dUTP, 5-methyl-CTP, 5-methyl-dCTP, ITP, dITP, 2-aminoadenosine-TP, 2-amino-deoxyadenosine-TP, 2-thiothymidine triphosphate, pyrrolo-pyrimidine triphosphate, and 2-thiocytidine, as well as the alphathiotriphosphates for all of the above, and 2'-O-methyl-ribonucleotide triphosphates for all the above bases. Modified bases include, but are not limited to, 5-Br-UTP, 5-Br-dUTP, 5-F-UTP, 5-F-dUTP, 5-propynyl dCTP, and 5-propynyl-dUTP.

For example, a template polynucleotide chain may be any sample that is to be sequenced, and may be composed of DNA, RNA, or analogs thereof (e.g., peptide nucleic acids). The source of the template (or target) polynucleotide chain can be genomic DNA, messenger RNA, or other nucleic acids from native sources. In some cases, the template polynucleotide chain that is derived from such sources can be amplified prior to use. Any of a variety of known amplification techniques can be used including, but not limited to, polymerase chain reaction (PCR), rolling circle amplification (RCA), multiple displacement amplification (MDA), or random primer amplification (RPA). It is to be understood that amplification of the template polynucleotide chain prior to use is optional. As such, the template polynucleotide chain will not be amplified prior to use in some examples. Template/target polynucleotide chains can optionally be derived from synthetic libraries. Synthetic nucleic acids can have native DNA or RNA compositions or can be analogs thereof.

Biological samples from which the template polynucleotide chain can be derived include, for example, those from a mammal, such as a rodent, mouse, rat, rabbit, guinea pig, ungulate, horse, sheep, pig, goat, cow, cat, dog, primate, human or non-human primate; a plant such as *Arabidopsis thaliana*, corn, sorghum, oat, wheat, rice, canola, or soybean; an algae such as *Chlamydomonas reinhardtii*; a nematode such as *Caenorhabditis elegans*; an insect such as *Drosophila melanogaster*, mosquito, fruit fly, honey bee or spider; a fish such as zebrafish; a reptile; an amphibian such as a frog or *Xenopus laevis*; a Dictyostelium discoideum; a fungi such as *Pneumocystis carinii Takifugu rubripes*, yeast, *Saccharamoyces cerevisiae* or *Schizosaccharomyces pombe*; or a *Plasmodium falciparum*. Template polynucleotide chains 48 can also be derived from prokaryotes such as a bacterium, *Escherichia coli*, staphylococci or *Mycoplasma pneumoniae*; an archae; a virus such as Hepatitis C virus, ebola virus or human immunodeficiency virus; or a viroid. Template polynucleotide chains can be derived from a homogeneous culture or population of the above organisms or alternatively from a collection of several different organisms, for example, in a community or ecosystem.

Moreover, template polynucleotide chains may not be derived from natural sources, but rather can be synthesized using known techniques. For example, gene expression probes or genotyping probes can be synthesized and used in the examples set forth herein.

In some examples, template polynucleotide chains can be obtained as fragments of one or more larger nucleic acids. Fragmentation can be carried out using any of a variety of techniques known in the art including, for example, nebulization, sonication, chemical cleavage, enzymatic cleavage, or physical shearing. Fragmentation may also result from use of a particular amplification technique that produces amplicons by copying only a portion of a larger nucleic acid chain. For example, PCR amplification produces fragments having a size defined by the length of the nucleotide sequence on the original template that is between the locations where flanking primers hybridize during amplification. The length of the template polynucleotide chain may be in terms of the number of nucleotides or in terms of a metric length (e.g., nanometers).

A population of template/target polynucleotide chains, or amplicons thereof, can have an average strand length that is desired or appropriate for a particular sequencing device. For example, the average strand length can be less than about 100,000 nucleotides, about 50,000 nucleotides, about 10,000 nucleotides, about 5,000 nucleotides, about 1,000 nucleotides, about 500 nucleotides, about 100 nucleotides, or about 50 nucleotides. Alternatively or additionally, the average strand length can be greater than about 10 nucleotides, about 50 nucleotides, about 100 nucleotides, about 500 nucleotides, about 1,000 nucleotides, about 5,000 nucleotides, about 10,000 nucleotides, about 50,000 nucleotides, or about 100,000 nucleotides. Alternatively or additionally, the average strand length can be greater than about 10 kilo nucleotides, about 50 kilo nucleotides, about 100 kilo nucleotides, about 500 kilo nucleotides, about 1,000 kilo nucleotides, about 5,000 kilo nucleotides, about 10,000 kilo nucleotides, about 50,000 kilo nucleotides, or about 100,000 kilo nucleotides. Alternatively or additionally, the average strand length can be greater than about 10 mega nucleotides, about 50 mega nucleotides, about 100 mega nucleotides, about 500 mega nucleotides, about 1,000 mega nucleotides, about 5,000 mega nucleotides, about 10,000 mega nucleotides, about 50,000 mega nucleotides, or about 100,000 mega nucleotides. The average strand length for a population of target polynucleotide chains, or amplicons thereof, can be in a range between a maximum and minimum value set forth above.

In some cases, a population of template/target polynucleotide chains can be produced under conditions or otherwise configured to have a maximum length for its members. For example, the maximum length for the members can be less than about 100,000 nucleotides, about 50,000 nucleotides, about 10,000 nucleotides, about 5,000 nucleotides, about 1,000 nucleotides, about 500 nucleotides, about 100 nucleotides or about 50 nucleotides. For example, the maximum length for the members can be less than about 100,000 kilo nucleotides, about 50,000 kilo nucleotides, about 10,000 kilo nucleotides, about 5,000 kilo nucleotides, about 1,000 kilo nucleotides, about 500 kilo nucleotides, about 100 kilo nucleotides or about 50 kilo nucleotides. For example, the maximum length for the members can be less than about 100,000 mega nucleotides, about 50,000 mega nucleotides, about 10,000 mega nucleotides, about 5,000 mega nucleotides, about 1,000 mega nucleotides, about 500 mega nucleotides, about 100 mega nucleotides or about 50 mega nucleotides. Alternatively or additionally, a population of template polynucleotide chains, or amplicons thereof, can be produced under conditions or otherwise configured to have a minimum length for its members. For example, the minimum length for the members can be more than about 10 nucleotides, about 50 nucleotides, about 100 nucleotides, about 500 nucleotides, about 1,000 nucleotides, about 5,000 nucleotides, about 10,000 nucleotides, about 50,000 nucleotides, or about 100,000 nucleotides. For example, the minimum length for the members can be more than about 10 kilo nucleotides, about 50 kilo nucleotides, about 100 kilo nucleotides, about 500 kilo nucleotides, about 1,000 kilo nucleotides, about 5,000 kilo nucleotides, about 10,000 kilo nucleotides, about 50,000 kilo nucleotides, or about 100,000 kilo nucleotides. For example, the minimum length for the members can be more than about 10 mega nucleotides, about 50 mega nucleotides, about 100 mega nucleotides, about 500 mega nucleotides, about 1,000 mega nucleotides, about 5,000 mega nucleotides, about 10,000 mega nucleotides, about 50,000 mega nucleotides, or about 100,000 mega nucleotides. The maximum and minimum strand length for template polynucleotide chains in a population can be in a range between a maximum and minimum value set forth above.

As used herein, the term "signal" is intended to mean an indicator that represents information. Signals include, for example, an electrical signal and an optical signal. The term "electrical signal" refers to an indicator of an electrical quality that represents information. The indicator can be, for example, current, voltage, tunneling, resistance, potential, voltage, conductance, or a transverse electrical effect (and any time-derivatives or transients of theses). An "electronic current" or "electric current" refers to a flow of electric charge. In an example, an electrical signal may be an electric current passing through a nanopore, and the electric current may flow when an electric potential difference is applied across the nanopore.

The term "substrate" refers to a rigid, solid support that is insoluble in aqueous liquid and is incapable of passing a liquid absent an aperture, port, or other like liquid conduit. In the examples disclosed herein, the substrate may have wells or chambers defined therein. Examples of suitable substrates include glass and modified or functionalized glass, plastics (including acrylics, polystyrene and copolymers of styrene and other materials, polypropylene, polyethylene, polybutylene, polyurethanes, polytetrafluoroethylene (PTFE) (such as TEFLON® from Chemours), cyclic olefins/cyclo-olefin polymers (COP) (such as ZEONOR® from Zeon), polyimides, etc.), nylon, ceramics, silica or silica-based materials, silicon and modified silicon, carbon, metals, inorganic glasses, and optical fiber bundles.

As used herein, the term "interstitial region" refers to an area in a substrate/solid support or a membrane, or an area on a surface that separates other areas, regions, features associated with the support or membrane or surface. For example, an interstitial region of a membrane can separate one nanopore of an array from another nanopore of the array. For another example, an interstitial region of a substrate can separate one trans/cis well from another trans/cis well. The two areas that are separated from each other can be discrete, i.e., lacking physical contact with each other. In many examples, the interstitial region is continuous whereas the areas are discrete, for example, as is the case for a plurality of nanopores defined in an otherwise continuous membrane, or for a plurality of wells defined in an otherwise continuous substrate/support. The separation provided by an interstitial region can be partial or full separation. Interstitial regions may have a surface material that differs from the surface material of the features defined in the surface. For example, the surface material at the interstitial regions may be a lipid material, and a nanopore formed in the lipid material can have an amount or concentration of polypeptide that exceeds the amount or concentration present at the interstitial regions. In some examples, the polypeptide may not be present at the interstitial regions.

The terms top, bottom, lower, upper, on, etc. are used herein to describe the device/nanopore sequencer and/or the various components of the device. It is to be understood that these directional terms are not meant to imply a specific orientation, but are used to designate relative orientation between components. The use of directional terms should not be interpreted to limit the examples disclosed herein to any specific orientation(s). As used herein, the terms "upper", "lower", "vertical", "horizontal" and the like are meant to indicate relative orientation.

As used herein, the "horizontal" direction refers to a direction substantially parallel to the surface of a substrate (e.g., a glass or silicon wafer).

As used herein, "cis" refers to the side of a nanopore opening through which an analyte or modified analyte enters the opening or across the face of which the analyte or modified analyte moves.

As used herein, "trans" refers to the side of a nanopore opening through which an analyte or modified analyte (or fragments thereof) exits the opening or across the face of which the analyte or modified analyte does not move.

As used herein, by "translocation," it is meant that an analyte (e.g., DNA) enters one side of an opening of a nanopore and move to and out of the other side of the opening. It is contemplated that any embodiment herein comprising translocation may refer to electrophoretic translocation or non-electrophoretic translocation, unless specifically noted. An electric field may move an analyte (e.g., a polynucleotide) or modified analyte. By "interacts," it is meant that the analyte (e.g., DNA) or modified analyte moves into and, optionally, through the opening, where "through the opening" (or "translocates") means to enter one side of the opening and move to and out of the other side of the opening. Optionally, methods that do not employ electrophoretic translocation are contemplated. In some embodiments, physical pressure causes a modified analyte to interact with, enter, or translocate (after alteration) through the opening. In some embodiments, a magnetic bead is attached to an analyte or modified analyte on the trans side, and magnetic force causes the modified analyte to interact with, enter, or translocate (after alteration) through the opening. Other methods for translocation include but not limited to gravity, osmotic forces, temperature, and other physical forces such as centripetal force.

As used herein, the terms "well", "cavity", "reservoir" and "chamber" are used synonymously, and refer to a discrete feature defined in the device that can contain a fluid (e.g., liquid, gel, gas). A cis well is a chamber that contains or is partially defined by a cis electrode, and is also fluidically connected to a middle well where measurements occur (for example, by a FET, or by a metal electrode connected to an amplifier, a data acquisition device, or other signal conditioning elements such as analog filters, buffers, gain amplifiers, ADCs, etc.). The middle well in turn is fluidically connected to a trans well/chamber, in some examples. Examples of an array of the present device may have one cis well, for example one global cis chamber/reservoir, or multiple cis wells. The trans well is a single chamber that contains or is partially defined by its own trans electrode, and is also fluidically connected to a cis well. In examples including multiple trans wells, each trans well is electrically isolated from each other trans well. Further, it is to be understood that the cross-section of a well taken parallel to a surface of a substrate at least partially defining the well can be curved, square, polygonal, hyperbolic, conical, angular, etc.

As used herein, "field-effect transistors" or "FETs" typically include doped source/drain regions that are formed of a semiconductor material, e.g., silicon, germanium, gallium arsenide, silicon carbide, etc., and are separated by a channel region. A n-FET is a FET having an n-channel in which the current carriers are electrons. A p-FET is a FET having a p-channel in which the current carriers are holes. Source/drain regions of a n-FET device may include a different material than source/drain regions of a p-FET device. In some examples, the source/drain regions or the channel may not be doped. Doped regions may be formed by adding dopant atoms to an intrinsic semiconductor. This changes the electron and hole carrier concentrations of the intrinsic semiconductor at thermal equilibrium. A doped region may be p-type or n-type. As used herein, "p-type" refers to the addition of impurities to an intrinsic semiconductor that creates a deficiency of valence electrons. For silicon, example p-type dopants, i.e., impurities, include but are not limited to boron, aluminum, gallium, and indium. As used herein, "n-type" refers to the addition of impurities that contribute free electrons to an intrinsic semiconductor. For silicon, example n-type dopants, i.e., impurities, include but are not limited to, antimony, arsenic, and phosphorus. The dopant(s) may be introduced by ion implantation or plasma doping.

For example, in an integrated circuit having a plurality of metal oxide semiconductor field effect transistors (MOS-FETs), each MOSFET has a source and a drain that are formed in an active region of a semiconductor layer by implanting n-type or p-type impurities in the layer of semiconductor material. Disposed between the source and the drain is a channel (or body) region. Disposed above the body region is a gate electrode. The gate electrode and the body are spaced apart by a gate dielectric (gate oxide) layer. The channel region connects the source and the drain, and electrical current flows through the channel region from the source to the drain. The electrical current flow is induced in the channel region by a voltage applied at the gate electrode.

As used herein, a "porous structure" or "frit" refers to a body that has pore portions. The typical pore size of the pore portion may be, for example, about 100 µm or less, about 50 µm or less, about 10 µm or less, about 5 µm or less, about 1 µm or less, about 500 nm or less, about 100 nm or less, about 50 nm or less, about 10 nm or less, about 5 nm or less, about 1 nm or less, about 500 Å or less, about 100 Å or less, about 50 Å or less, about 10 Å or less, about 5 Å or less, about 100 µm or more, about 50 µm or more, about 10 µm or more, about 5 µm or more, about 1 µm or more, about 500 nm or more, about 100 nm or more, about 50 nm or more, about 10 nm or more, about 5 nm or more, about 1 nm or more, about 500 Å or more, about 100 Å or more, about 50 Å or more, about 10 Å or more, about 5 Å or more, between about 500 and about 100 µm, between about 250 and about 50 µm, between about 125 and about 25 µm, between about 50 and about 10 µm, between about 25 and about 5 µm, between about 12.5 and about 2.5 µm, between about 5.5 and about 0.5 µm, between about 500 and about 100 nm, between about 250 and about 50 nm, between about 125 and about 25 nm, between about 50 and about 10 nm, between about 25 and about 5 nm, between about 12.5 and about 2.5 nm, between about 5.5 and about 0.5 nm, between about 500 and about 100 Å, between about 250 and about 50 Å, between about 125 and about 25 Å, between about 50 and about 10 Å, between about 25 and about 5 Å, between about 12.5 and about 2.5 Å, or between about 5.5 and about 1 Å. There may be a distribution of different pore sizes.

The porous structure may be formed of a porous material comprising a matrix defining an array of pores having a porosity sufficient to enable the desired function of the porous material. As used herein, the term "porosity" refers to the amount of void space in a porous material comprising a matrix. As such, the total volume of a porous material comprising a matrix is based upon the matrix space and the void space. As used herein, the term "void space" refers to actual or physical space in a porous material comprising a matrix. As such, the total volume of a porous material comprising a matrix disclosed herein is based upon the matrix space and the void space. For example, a porous material comprising a matrix defining an array of pores may have a porosity of, e.g., about 40% of the total volume of a matrix, about 50% of the total volume of a matrix, about 60% of the total volume of a matrix, about 70% of the total volume of a matrix, about 80% of the total volume of a matrix, about 90% of the total volume of a matrix, about 95% of the total volume of a matrix, or about 97% of the total volume of a matrix, at least about 40% of the total volume of a matrix, at least about 50% of the total volume of a matrix, at least about 60% of the total volume of a matrix, at least about 70% of the total volume of a matrix, at least about 80% of the total volume of a matrix, at least about 90% of the total volume of a matrix, at least about 95% of the total volume of a matrix, or at least about 97% of the total volume of a matrix, at most about 40% of the total volume of a matrix, at most about 50% of the total volume of a matrix, at most about 60% of the total volume of a matrix, at most about 70% of the total volume of a matrix, at most about 80% of the total volume of a matrix, at most about 90% of the total volume of a matrix, at most about 95% of the total volume of a matrix, or at most about 97% of the total volume of a matrix, about 40% to about 97% of the total volume of a matrix, about 50% to about 97% of the total volume of a matrix, about 60% to about 97% of the total volume of a matrix, about 70% to about 97% of the total volume of a matrix, about 80% to about 97% of the total volume of a matrix, about 90% to about 97% of the total volume of a matrix, about 40% to about 95% of the total volume of a matrix, about 50% to about 95% of the total volume of a matrix, about 60% to about 95% of the total volume of a matrix, about 70% to about 95% of the total volume of a matrix, about 80% to about 95% of the total volume of a matrix, about 90% to about 95% of the total volume of a matrix, about 40% to about 90% of the total volume of a matrix, about 50% to about 90% of the total volume of a matrix, about 60% to about 90% of the total volume of a matrix, about 70% to about 90% of the total volume of a matrix, or about 80% to about 90% of the total volume of a matrix. For example, a porous material comprising a matrix defining an array of pores may have a void space of, e.g., about 50% of the total volume of a matrix, about 60% of the total volume of a matrix, about 70% of the total volume of a matrix, about 80% of the total volume of a matrix, about 90% of the total volume of a matrix, about 95% of the total volume of a matrix, or about 97% of the total volume of a matrix, at least about 50% of the total volume of a matrix, at least about 60% of the total volume of a matrix, at least about 70% of the total volume of a matrix, at least about 80% of the total volume of a matrix, at least about 90% of the total volume of a matrix, at least about 95% of the total volume of a matrix, or at least about 97% of the total volume of a matrix, at most about 50% of the total volume of a matrix, at most about 60% of the total volume of a matrix, at most about 70% of the total volume of a matrix, at most about 80% of the total volume of a matrix, at most about 90% of the total volume of a matrix, at most about 95% of the total volume of a matrix, or at most 97% of the total volume of a matrix, about 50% to about 97% of the total volume of a matrix, about 60% to about 97% of the total volume of a matrix, about 70% to about 97% of the total volume of a matrix, about 80% to about 97% of the total volume of a matrix, about 90% to about 97% of the total volume of a matrix, about 50% to about 95% of the total volume of a matrix, about 60% to about 95% of the total volume of a matrix, about 70% to about 95% of the total volume of a matrix, about 80% to about 95% of the total volume of a matrix, about 90% to about 95% of the total volume of a matrix, about 50% to about 90% of the total volume of a matrix, about 60% to about 90% of the total volume of a matrix, about 70% to about 90% of the total volume of a matrix, or about 80% to about 90% of the total volume of a matrix.

The porous structure may be a porous matrix, a porous membrane, an ionomer permeable to certain types of ions, a porous glass frit, an ion-selective membrane, an ion-conductive glass, a polymer membrane, or an ion-conductive membrane. The porous structure may be formed of microporous materials such as ceramic or glass frits, ceramic or glass membranes, or solid porous substrates such as frits or wafers prepared from polymers or inorganic materials. The glass frits may contain, for example, magnesium oxide, calcium oxide, strontium oxide, barium oxide, cesium oxide, sodium oxide, potassium oxide, boron oxide, vanadium oxide, zinc oxide, tellurium oxide, aluminum oxide, silicon dioxide, lead oxide, tin oxide, phosphorus oxide, ruthenium oxide, rhodium oxide, iron oxide, copper oxide, manganese dioxide, molybdenum oxide, niobium oxide, titanium oxide, tungsten oxide, bismuth oxide, zirconium oxide, lithium oxide, antimony oxide, lead borate glass, tin phosphate glass, vanadate glass, or borosilicate glass.

In some examples the porous structure may include microporous membranes formed of polysulfone, polyethersulfone, or polyvinylidene fluoride. In some example, the porous structure may be formed of a resin material such as polyolefin such as polyethylene (PE), polyethylene terephthalate (PET), polybutylene terephthalate (PBT), polypropylene (PP), polytetrafluoroethylene (PTFE) or the like. Further, a hollow fiber membrane in a laminated structure having a non-porous film and porous films provided to hold the non-porous film in between may be used. In some example, the porous structure may be formed of PEDOT:PSS (poly(3,4-ethylenedioxythiophene) polystyrene sulfonate), silicone, polytetrafluoroethylene, polyethylene-co-tetrafluoroethylene, polyolefin, polyester, polycarbonate, biostable polytetrafluoroethylene, homopolymers, copolymers, terpolymers of polyurethanes, polypropylene (PP), polyvinylchloride (PVC), polyvinylidene fluoride (PVDF), polybutylene terephthalate (PBT), polymethylmethacrylate (PMMA), polyether ether ketone (PEEK), polyurethanes, cellulosic polymers, polysulfones and block copolymers thereof including, for example, di-block, tri-block, alternating, random and graft copolymers.

In some examples, the porous structure may be formed of a porous silicon dioxide, organosilicate glass (carbon-doped oxide), indium tin oxide (ITO), or low-K (low dielectric constant) dielectrics including silicon carbon boron nitride (SiCBN), silicon oxycarbonitride (SiOCN), fluorine doped silicon dioxide, carbon doped silicon dioxide, diamond-like carbon (DLC) and combinations thereof. Such porous low-materials are commercially available for growth using chemical vapour deposition (CVD) under trade names such as Orion™ from Trikon, BDIIx™ from AMAT and Aurora™ from ASMi. Alternative materials can be deposited by being spun on—such materials include SiLK™ from Dow Chemical and LKD™ from JSR. For example, a low-κ porous organosilicate glass may have a dielectric constant approximately 2.7, and a porosity (defined as the volume of pores divided by the total volume including pores and the material between the pores) greater than 10%. For example, a porous silicon dioxide may have porosity between about 15 to 40%, or between about 30 to 35%. The porous silicon dioxide may have a configuration of vertical and horizontal pores following the crystallographic orientation of the <100> silicon body. The porous silicon dioxide may be formed from a substrate material, for example based on porous silicon. In some examples, the porous structure may be formed of a porous material formed by porosification. In some examples, the porous material may be a nano-porous material that is to say with pores of size or diameter of the nanometer order. The porous material formed by porosification may be provided with pores of small diameter, for example between about 2 nm and about 100 nm. The porous material formed by porosification can be made with an open porosity greater than 30%. In some examples, the porous structure may be formed of a porous material formed by porosification of low-κ materials including, but not limited to, silicon boron nitride (SiBN), silicon carbon nitride (SiCN), silicon boron carbon nitride (SiBCN), hydrogen silsesquioxane polymer (HSQ), methyl silsesquioxane polymer (MSQ), polyphenylene oligomer, methyl doped silica or SiOx(CH3)y, SiCxOyHy or SiOCH, organosilicate glass (SiCOH), silicon oxide, boron nitride, and silicon oxynitride.

The aspects and examples set forth herein and recited in the claims can be understood in view of the above definitions.

ADDITIONAL NOTES

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range, as if such value or sub-range were explicitly recited. For example, a range from about 2 nm to about 20 nm should be interpreted to include not only the explicitly recited limits of from about 2 nm to about 20 nm, but also to include individual values, such as about 3.5 nm, about 8 nm, about 18.2 nm, etc., and sub-ranges, such as from about 5 nm to about 10 nm, etc. Furthermore, when "about" and/or "substantially" are/is utilized to describe a value, this is meant to encompass minor variations (up to +/−10%) from the stated value.

While several examples have been described in detail, it is to be understood that the disclosed examples may be modified. Therefore, the foregoing description is to be considered non-limiting.

While certain examples have been described, these examples have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, or example are to be understood to be applicable to any other aspect or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing examples. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some examples, the actual steps taken in the processes illustrated and/or disclosed may differ from those shown in the figures. Depending on the example, certain of the steps described above may be removed or others may be added. Furthermore, the features and attributes of the specific examples disclosed above may be combined in different ways to form additional examples, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular example. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without user input or prompting, whether these features, elements, and/or steps are included or are to be performed in any particular example.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

Language of degree used herein, such as the terms "approximately," "about," "generally," and "substantially" represent a value, amount, or characteristic close to the stated value, amount, or characteristic that still performs a desired function or achieves a desired result.

The scope of the present disclosure is not intended to be limited by the specific disclosures of preferred examples in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A device, comprising an array of nanopore cells, each of the nanopore cells comprising:
   a cis well;
   a trans well;
   a membrane support between the cis well and the trans well;
   a bubble generating electrode disposed in the trans well; and
   a switch operably connecting the bubble generating electrode to a voltage source.

2. The device as defined in claim 1, wherein the trans well comprises an electrolyte and the bubble generating electrode is configured to electrolyze the electrolyte to generate a bubble when the switch is positioned to connect the voltage source to the bubble generating electrode.

3. The device of claim 2, wherein electrolyzing the electrolyte results in at least one bubble to form in the trans well.

4. The device of claim 2, wherein the bubble generating electrode is further operably connected to a gate terminal of a field effect transistor (FET), and wherein the FET is turned off when the switch connects the voltage source to the bubble generating electrode.

5. The device as defined in claim 1, wherein the switch is configured to connect the voltage source to the bubble generating electrode when the device detects that the membrane support has malfunctioned.

6. The device as defined in claim 1, wherein a nanopore extends through the membrane support.

7. The device as defined in claim 6, wherein the nanopore is an orifice in a structure formed of one or more polynucleotides, one or more polypeptides, one or more types of biopolymers, one or more carbon nanotubes, one or more types of solid-state materials, or any combination thereof disposed in the membrane support.

8. The device as defined in claim 1, wherein the membrane support is formed of lipid, silicon, graphene, a solid-state material, a synthetic material, a biomimetic equivalent of lipid, or any combination thereof.

9. The device as defined in claim 1, wherein device comprises a wafer having a plurality of sequencing channels configured to allow a biopolymer to translocate substantially horizontally or substantially vertically with respect to a surface of the wafer.

10. A device, comprising an array of nanopore cells, each of the nanopore cells comprising:
    a cis well;
    a trans well;
    a membrane support between the cis well and the trans well; and
    a bubble generating electrode disposed in the trans well, wherein the bubble generating electrode is formed of a corrosion-resistant material.

11. The device as defined in claim 10, wherein a nanopore extends through the membrane support.

12. A device, comprising an array of nanopore cells, each of the nanopore cells comprising:
    a cis well;
    a trans well;
    a membrane support between the cis well and the trans well; and
    a bubble generating electrode disposed in the trans well, wherein the bubble generating electrode is further operably connected to a voltage detector.

13. The device as defined in claim 12, wherein a nanopore extends through the membrane support.

14. A device, comprising an array of nanopore cells, each of the nanopore cells comprising:
    a cis well;
    a trans well;
    a membrane support between the cis well and the trans well; and
    a heating element positioned to heat an electrolyte to generate a bubble,
    wherein the heating element is activated by a switch operably connecting the heating element to a voltage source.

15. The device of claim 14, wherein the heating element is a resistive heater configured to generate the bubble within the trans well.

16. The device of claim 15, wherein the device is configured to activate the heating element when the device detects that the membrane support has malfunctioned.

17. A device, comprising:
    a cis well;
    a trans well;
    a membrane support between the cis well and the trans well; and
    a valve configured to block a fluidic connection within the device, wherein the valve is configured to block the fluidic connection when the device detects that the membrane support has malfunctioned.

18. A device, comprising:
    a cis well;
    a trans well;
    a membrane support between the cis well and the trans well; and
    a valve configured to block a fluidic connection within the device, wherein the valve is actuated electrostatically, electrokinetically, electrochemically, electromagnetically, pneumatically, thermally, or any combination thereof.

19. A device, comprising:
    a cis well;
    a trans well;
    a membrane support between the cis well and the trans well; and a valve configured to block a fluidic connection within the device, wherein the valve comprises an elastomeric membrane, a silicon membrane, a flap, a cavity configured to store fluid, a heating element, one or more electrodes, or any combination thereof.

20. A device, comprising:

a cis well;

a trans well;

a membrane support between the cis well and the trans well; and a valve configured to block a fluidic connection within the device, wherein at least a portion of the valve is formed of stimuli-responsive polymers, redox-responsive materials, hydrogels, or any combination thereof.

21. The device as defined in claim 20, wherein at least a portion of the valve changes volume in response to an electrical current.

22. A device, comprising:

a cis well;

a trans well;

a membrane support between the cis well and the trans well;

a valve configured to block a fluidic connection within the device; and a field effect transistor (FET).

23. A method of isolating a unit in an array for polynucleotide sequencing, the method comprising:

detecting that a unit in the array is non-functioning; and in response to the detection, isolating the unit by disrupting an ionic flow in the unit.

24. The method of claim 23, wherein disrupting an ionic flow in the unit comprises generating a bubble by way of electrolysis of a fluid in the unit.

25. The method of claim 23, wherein disrupting an ionic flow in the unit comprises generating a bubble by way of heating of a fluid in the unit.

26. The method of claim 23, wherein disrupting an ionic flow in the unit comprises closing an electrostatic valve in the unit by way of electrically actuating the electrostatic valve.

27. The method of claim 23, wherein disrupting an ionic flow in the unit comprises closing an elastomeric valve in the unit by way of thermally actuating the elastomeric valve.

28. The method of claim 23, wherein detecting that a unit in the array is non-functioning comprises detecting that an electrical potential in a predetermined compartment of the unit is below a threshold.

\* \* \* \* \*